US012543193B2

(12) United States Patent
Yuan et al.

(10) Patent No.: US 12,543,193 B2
(45) Date of Patent: Feb. 3, 2026

(54) MULTI-PANEL UPLINK TRANSMISSIONS WITH PRECODING

(71) Applicant: QUALCOMM Incorporated, San Diego, CA (US)

(72) Inventors: Fang Yuan, Beijing (CN); Wooseok Nam, San Diego, CA (US); Mostafa Khoshnevisan, San Diego, CA (US); Jing Sun, San Diego, CA (US); Yan Zhou, San Diego, CA (US); Xiaoxia Zhang, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 18/042,133

(22) PCT Filed: Oct. 27, 2020

(86) PCT No.: PCT/CN2020/123862
§ 371 (c)(1),
(2) Date: Feb. 17, 2023

(87) PCT Pub. No.: WO2022/087807
PCT Pub. Date: May 5, 2022

(65) Prior Publication Data
US 2023/0319844 A1    Oct. 5, 2023

(51) Int. Cl.
*H04W 72/232*    (2023.01)
*H04L 5/00*    (2006.01)

(52) U.S. Cl.
CPC ......... *H04W 72/232* (2023.01); *H04L 5/0051* (2013.01)

(58) Field of Classification Search
CPC .... H04B 7/022; H04B 7/0404; H04B 7/0456; H04B 7/0691; H04B 7/06956;
(Continued)

(56) References Cited

U.S. PATENT DOCUMENTS 9,742,477 B2 *   8/2017  Wu ...................... H04B 7/0456
10,205,618 B2 *  2/2019  Wang .................. H04L 27/2607
(Continued)

FOREIGN PATENT DOCUMENTS

CA    3114463 A1    4/2020
CN    109391402 A   2/2019
(Continued)

OTHER PUBLICATIONS

Supplementary European Search Report—EP20958972—Search Authority—Munich—Jul. 3, 2024.
(Continued)

*Primary Examiner* — Eric Nowlin
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive downlink control information indicating precoding information associated with a multi-panel uplink transmission, the precoding information including at least one of a demodulation reference signal port configuration associated with the multi-panel uplink transmission, a multiple-input multiple-output precoding configuration associated with the multi-panel uplink transmission, or a quantity of layers associated with the multi-panel uplink transmission. The UE may precode the multi-panel uplink transmission for transmission via a first antenna panel of the UE and a second antenna panel of the UE based at least in part on the precoding information. The UE may transmit, using the
(Continued)

first antenna panel and the second antenna panel, the precoded multi-panel uplink transmission. Numerous other aspects are provided.

30 Claims, 12 Drawing Sheets

(58) Field of Classification Search
CPC ... H04L 5/0023; H04L 5/0051; H04L 5/0053; H04W 72/232
See application file for complete search history.

(56) References Cited

U.S. PATENT DOCUMENTS

| | | | | |
|---|---|---|---|---|
| 10,763,930 | B2* | 9/2020 | Kang | H04W 72/541 |
| 10,771,138 | B2* | 9/2020 | Kang | H04B 7/0478 |
| 11,005,543 | B2* | 5/2021 | Yoshida | H04J 11/00 |
| 11,031,991 | B2* | 6/2021 | Ryu | H04B 7/0617 |
| 11,153,863 | B2* | 10/2021 | Miao | H04B 7/0689 |
| 11,632,153 | B2* | 4/2023 | Yoshida | H04B 7/0874 |
| | | | | 370/329 |
| 11,937,189 | B2* | 3/2024 | Haghighat | H04W 52/146 |
| 2012/0127948 | A1* | 5/2012 | Chung | H04L 5/0053 |
| | | | | 370/329 |
| 2016/0020836 | A1* | 1/2016 | Wu | H04B 7/0885 |
| | | | | 375/267 |
| 2017/0064680 | A1 | 3/2017 | Chen et al. | |
| 2019/0068352 | A1* | 2/2019 | Xiong | H04L 5/0051 |
| 2019/0123950 | A1* | 4/2019 | Wang | H04L 27/2646 |
| 2019/0181925 | A1* | 6/2019 | Kang | H04B 7/0456 |
| 2019/0181934 | A1* | 6/2019 | Kang | H04B 7/0608 |
| 2019/0280757 | A1* | 9/2019 | Yang | H04B 7/0697 |
| 2020/0220592 | A1* | 7/2020 | Ryu | H04B 7/0691 |
| 2020/0350977 | A1* | 11/2020 | Ryu | H04W 56/0045 |
| 2021/0075570 | A1* | 3/2021 | Xi | H04L 5/0051 |
| 2021/0136733 | A1* | 5/2021 | Miao | H04W 72/23 |
| 2021/0226679 | A1* | 7/2021 | Yoshida | H04W 72/04 |
| 2021/0367655 | A1* | 11/2021 | Jiang | H04B 7/0691 |
| 2022/0173951 | A1* | 6/2022 | Ji | H04L 5/0094 |

FOREIGN PATENT DOCUMENTS

| | | |
|---|---|---|
| CN | 110168947 A | 8/2019 |
| CN | 110945822 A | 3/2020 |
| CN | 111096036 A | 5/2020 |
| CN | 111614385 A | 9/2020 |
| KR | 20180107995 A | 10/2018 |
| WO | 2017020201 A1 | 2/2017 |
| WO | 2018049035 A1 | 3/2018 |

OTHER PUBLICATIONS

International Search Report and Written Opinion—PCT/CN2020/123862—ISA/EPO—Apr. 28, 2021.

* cited by examiner

MULTI-PANEL UPLINK TRANSMISSIONS WITH PRECODING

CROSS-REFERENCE TO RELATED APPLICATION

This application is a 371 national stage of Patent Cooperation Treaty (PCT) Application No. PCT/CN2020/123862 filed on Oct. 27, 2020, entitled "MULTI-PANEL UPLINK TRANSMISSIONS WITH PRECODING," which is hereby expressly incorporated by reference herein.

FIELD OF THE DISCLOSURE

Aspects of the present disclosure generally relate to wireless communication and specifically, to techniques and apparatuses for multi-panel uplink transmissions with precoding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some aspects, a precoding procedure that includes transform precoding may be applied to single layer uplink transmissions (for example, uplink communications transmitted using a single antenna panel of a user equipment (UE)) to reduce a peak-to-average power ratio (PAPR) associated with the uplink transmissions (for example, the PAPR may be associated with the single antenna panel). A precoding procedure that includes transform precoding may be designed to satisfy a PAPR requirement associated with an antenna panel of the UE. To satisfy a PAPR requirement for an antenna panel of the UE, the precoding procedure may be limited to single layer and single antenna panel uplink transmissions. However, in some cases, a UE may support multi-panel operation (for example, a UE may be capable of transmitting using multiple antenna panels). A PAPR of a UE that supports multi-panel operation may be determined on a per-antenna panel basis (for example, each antenna panel may be associated with a PAPR value or requirement). Therefore, a precoding procedure that includes transform precoding for only a single layer and a single antenna panel may be inapplicable to multi-panel uplink transmissions of the UE.

SUMMARY

In some aspects, a method of wireless communication performed by a user equipment (UE) includes receiving downlink control information (DCI) indicating precoding information associated with a multi-panel uplink transmission, the precoding information including at least one of a demodulation reference signal (DMRS) port configuration associated with the multi-panel uplink transmission, a multiple-input multiple-output (MIMO) precoding configuration associated with the multi-panel uplink transmission, or a quantity of layers associated with the multi-panel uplink transmission. In some aspects, the method includes precoding the multi-panel uplink transmission for transmission via a first antenna panel of the UE and a second antenna panel of the UE based at least in part on the precoding information. In some aspects, the method includes transmitting, using the first antenna panel and the second antenna panel, the precoded multi-panel uplink transmission.

In some aspects, a method of wireless communication performed by a base station includes determining, for a multi-panel uplink transmission associated with a UE, precoding information that includes at least one of a DMRS port configuration associated with the multi-panel uplink transmission, a MIMO precoding configuration associated with the multi-panel uplink transmission, or a quantity of layers associated with the multi-panel uplink transmission. In some aspects, the method includes transmitting, to the UE, DCI, associated with the multi-panel uplink transmission, that indicates the precoding information.

In some aspects, a UE for wireless communication includes a memory and one or more processors operatively coupled to the memory. The memory and the one or more processors may be configured to receive DCI indicating precoding information associated with a multi-panel uplink transmission, the precoding information including at least one of a DMRS port configuration associated with the multi-panel uplink transmission, a MIMO precoding configuration associated with the multi-panel uplink transmission, or a quantity of layers associated with the multi-panel uplink transmission. In some aspects, the memory and the one or more processors may be configured to precode the multi-panel uplink transmission for transmission via a first antenna panel of the UE and a second antenna panel of the UE based at least in part on the precoding information. In some aspects, the memory and the one or more processors may be configured to transmit, using the first antenna panel and the second antenna panel, the precoded multi-panel uplink transmission.

In some aspects, a base station for wireless communication includes a memory and one or more processors operatively coupled to the memory. The memory and the one or more processors may be configured to determine, for a multi-panel uplink transmission associated with a UE, precoding information that includes at least one of a DMRS port configuration associated with the multi-panel uplink transmission, a MIMO precoding configuration associated with the multi-panel uplink transmission, or a quantity of layers associated with the multi-panel uplink transmission. In some aspects, the memory and the one or more processors may be configured to transmit, to the UE, DCI, associated with the multi-panel uplink transmission, that indicates the precoding information.

In some aspects, a non-transitory computer-readable medium storing a set of instructions for wireless communication includes one or more instructions that, when executed by one or more processors of a UE, may cause the UE to receive DCI indicating precoding information associated with a multi-panel uplink transmission, the precoding information including at least one of a DMRS port configuration associated with the multi-panel uplink transmission, a MIMO precoding configuration associated with the multi-panel uplink transmission, or a quantity of layers associated with the multi-panel uplink transmission. In some aspects, the one or more instructions, when executed by one or more processors of the UE, may cause the UE to precode the multi-panel uplink transmission for transmission via a first antenna panel of the UE and a second antenna panel of the UE based at least in part on the precoding information. In some aspects, the one or more instructions, when executed by one or more processors of the UE, may cause the UE to transmit, using the first antenna panel and the second antenna panel, the precoded multi-panel uplink transmission.

In some aspects, a non-transitory computer-readable medium storing a set of instructions for wireless communication includes one or more instructions that, when executed by one or more processors of a base station, may cause the base station to determine, for a multi-panel uplink transmission associated with a UE, precoding information that includes at least one of a DMRS port configuration associated with the multi-panel uplink transmission, a MIMO precoding configuration associated with the multi-panel uplink transmission, or a quantity of layers associated with the multi-panel uplink transmission. In some aspects, the one or more instructions, when executed by one or more processors of a base station, may cause the base station to transmit, to the UE, DCI, associated with the multi-panel uplink transmission, that indicates the precoding information.

In some aspects, an apparatus for wireless communication includes means for receiving DCI indicating precoding information associated with a multi-panel uplink transmission, the precoding information including at least one of a DMRS port configuration associated with the multi-panel uplink transmission, a MIMO precoding configuration associated with the multi-panel uplink transmission, or a quantity of layers associated with the multi-panel uplink transmission. In some aspects, the apparatus may include means for precoding the multi-panel uplink transmission for transmission via a first antenna panel of the apparatus and a second antenna panel of the apparatus based at least in part on the precoding information. In some aspects, the apparatus may include means for transmitting, using the first antenna panel and the second antenna panel, the precoded multi-panel uplink transmission.

In some aspects, an apparatus for wireless communication includes means for determining, for a multi-panel uplink transmission associated with a UE, precoding information that includes at least one of a DMRS port configuration associated with the multi-panel uplink transmission, a MIMO precoding configuration associated with the multi-panel uplink transmission, or a quantity of layers associated with the multi-panel uplink transmission. In some aspects, the apparatus may include means for transmitting, to the UE, DCI, associated with the multi-panel uplink transmission, that indicates the precoding information.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
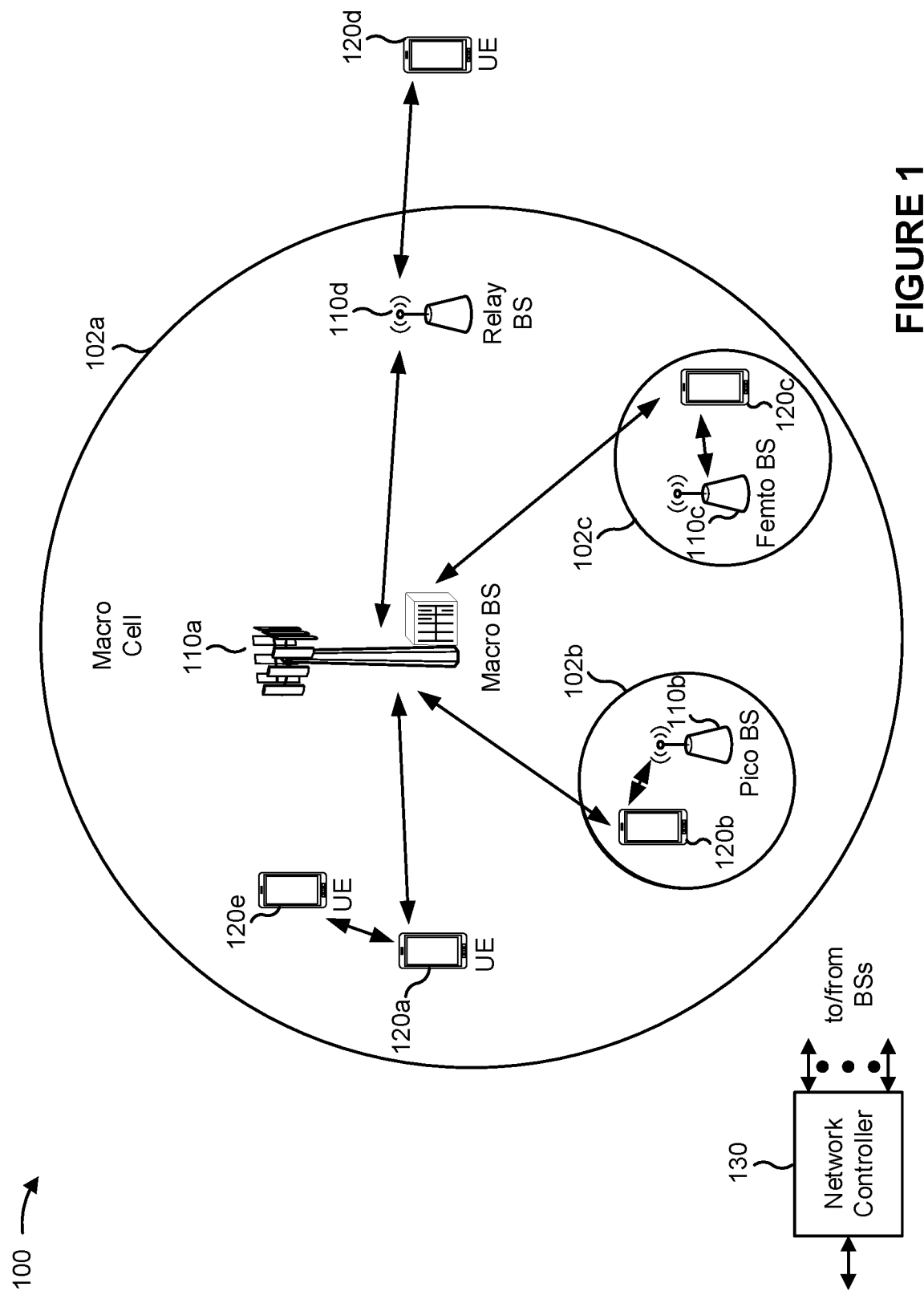
FIG. 1 is a diagram illustrating an example of a wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Various aspects relate generally to multi-panel uplink transmissions with precoding. Some aspects more specifically relate to multi-panel uplink transmissions that are generated using a precoding procedure that includes transform precoding. In some aspects, a user equipment (UE) may receive an indication of precoding information associated with the multi-panel uplink transmission. In some aspects, the precoding information may include a quantity of layers associated with a multi-panel uplink transmission, an indication of one or more demodulation reference signal (DMRS) ports associated with a multi-panel uplink transmission, or multiple-input multiple-output (MIMO) precoding information (such as one or more sounding reference signal (SRS) resource indicators (SRIs), one or more transmit precoder matrix indicator (TPMIs), or one or more uplink transmission configuration indicator (TCI) states), among other examples. In some aspects, the UE may generate the multi-panel uplink transmission in accordance with the precoding information (for example, by performing one or more precoding procedures based at least in part on the precoding information). The UE may then transmit the multi-panel uplink transmission using multiple antenna panels.

Particular aspects of the subject matter described in this disclosure can be implemented to realize one or more of the following potential advantages. In some examples, the described techniques can be used to enable the UE to perform precoding procedures (such as precoding procedures that include transform precoding) associated with multi-panel uplink transmissions. The precoding procedures associated with multi-panel uplink transmissions may enable the UE to exploit the independent peak-to-average power ratios (PAPRs) of different antenna panels of the UE 120. This may improve a transmission efficiency associated with the precoding procedures (for example, when compared to precoding procedures that are limited to a single layer and a single antenna panel).

FIG. 1 is a diagram illustrating an example of a wireless network in accordance with various aspects of the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
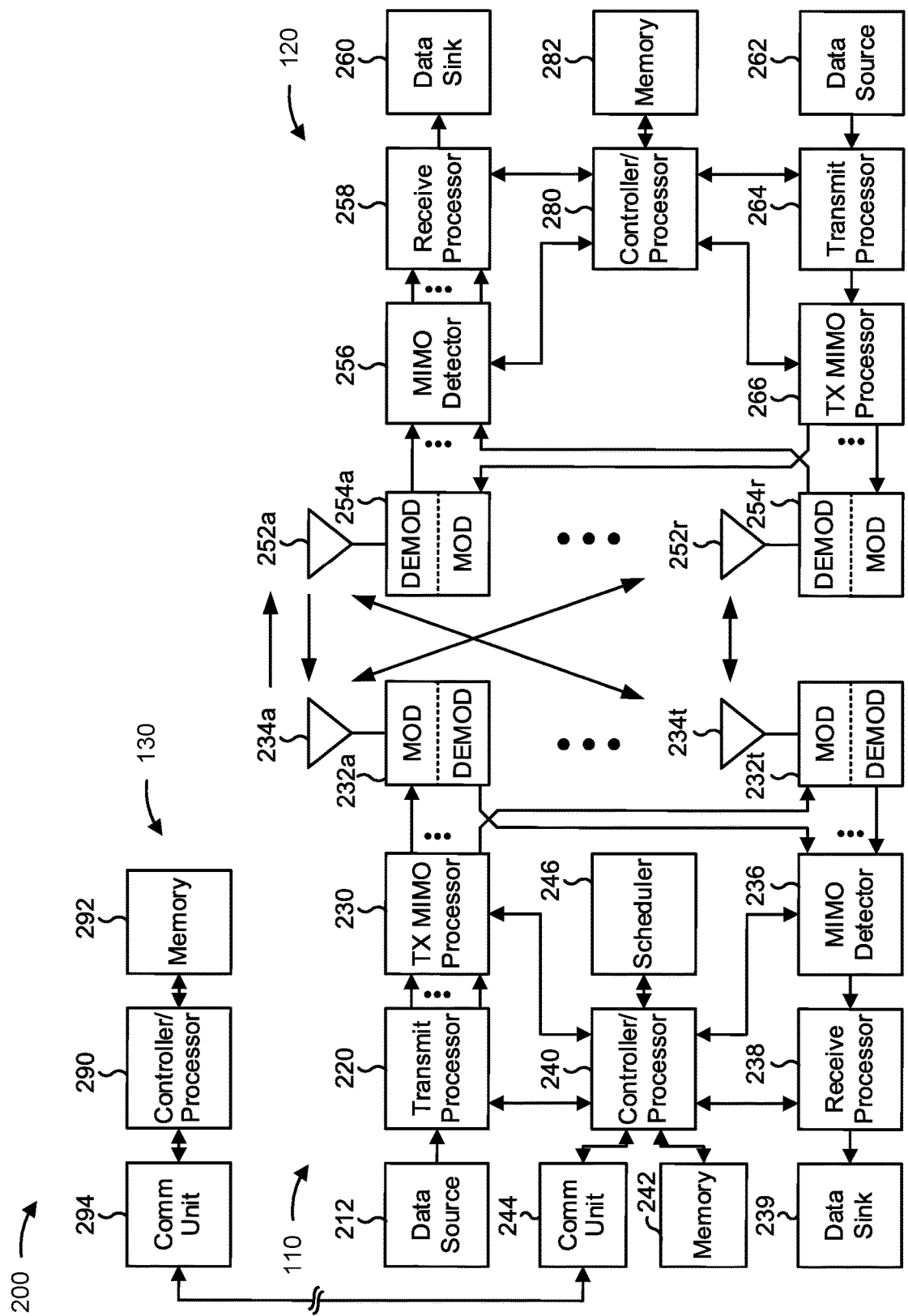
FIG. 2 is a diagram illustrating an example base station (BS) in communication with a user equipment (UE) in a wireless network in accordance with various aspects of the present disclosure.

FIG. 2 is a diagram illustrating an example base station in communication with a UE in a wireless network in accordance with various aspects of the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to Tmodulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with multi-panel uplink transmission with precoding, as described in more detail elsewhere herein. For example, controller/processor 240 of base station 110, controller/processor 280 of UE 120, or any other component(s) of FIG. 2 may perform or direct operations of, for example, process 900 of FIG. 9, process 1000 of FIG. 10, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, or other processes as described herein. In some aspects, executing instructions may include running the instructions, converting the instructions, compiling the instructions, or interpreting the instructions, among other examples.

In some aspects, the UE 120 includes means for receiving downlink control information (DCI) indicating precoding information associated with a multi-panel uplink transmission, the precoding information including at least one of a DMRS port configuration associated with the multi-panel uplink transmission, a MIMO precoding configuration associated with the multi-panel uplink transmission, or a quantity of layers associated with the multi-panel uplink transmission. In some aspects, the UE 120 includes means for precoding the multi-panel uplink transmission for transmission via a first antenna panel of the UE and a second antenna panel of the UE in accordance with precoding information. In some aspects, the UE 120 includes means for transmitting, using the first antenna panel and the second antenna panel, the precoded multi-panel uplink transmission. The means for the UE 120 to perform operations described herein may include, for example, antenna 252, demodulator 254, MIMO detector 256, receive processor 258, transmit processor 264, TX MIMO processor 266, modulator 254, controller/processor 280, or memory 282.

In some aspects, the UE 120 includes means for applying a first MIMO precoder, indicated by the MIMO precoding configuration, to a DMRS port, indicated by the DMRS port configuration, to generate the multi-panel uplink transmission for the first antenna panel. In some aspects, the UE 120 includes means for applying a second MIMO precoder, indicated by the MIMO precoding configuration, to the DMRS port to generate the multi-panel uplink transmission for the second antenna panel.

In some aspects, the UE 120 includes means for applying the first MIMO precoder to the first DMRS port to generate the multi-panel uplink transmission for the first antenna panel. In some aspects, the UE 120 includes means for applying the second MIMO precoder to the second DMRS port to generate the multi-panel uplink transmission for the second antenna panel.

In some aspects, the UE 120 includes means for mapping the multi-panel uplink transmission to the first layer and the second layer. In some aspects, the UE 120 includes means for applying the first MIMO precoder to the first DMRS port and the first layer to generate the multi-panel uplink transmission for the first antenna panel. In some aspects, the UE 120 includes means for applying the second MIMO precoder to the second DMRS port and the second layer to generate the multi-panel uplink transmission for the second antenna panel.

In some aspects, the UE 120 includes means for applying a first transform precoder to the first layer to generate the multi-panel uplink transmission for the first antenna panel. In some aspects, the UE 120 includes means for applying a second transform precoder to the second layer to generate the multi-panel uplink transmission for the second antenna panel.

In some aspects, the base station 110 includes means for determining, for a multi-panel uplink transmission associated with a UE, precoding information that includes at least one of a DMRS port configuration associated with the multi-panel uplink transmission, a MIMO precoding configuration associated with the multi-panel uplink transmission, or a quantity of layers associated with the multi-panel uplink transmission. In some aspects, the base station 110 includes means for transmitting, to the UE, DCI, associated with the multi-panel uplink transmission, that indicates the precoding information. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for receiving, from the UE, the multi-panel uplink transmission in accordance with the precoding information.

In some aspects, the base station 110 includes means for receiving the multi-panel uplink transmission as at least one of a single frequency network (SFN) multi-panel uplink transmission or a frequency division multiplexed (FDM) multi-panel uplink transmission. In some aspects, the base station 110 includes means for determining a first DMRS code-division multiplexing (CDM) group associated with the first DMRS port. In some aspects, the base station 110 includes means for determining a second DMRS CDM group associated with the second DMRS port.

In some aspects, the base station 110 includes means for determining a first transform precoder associated with the first layer. In some aspects, the base station 110 includes means for determining a second transform precoder associated with the second layer.

Figure 3:
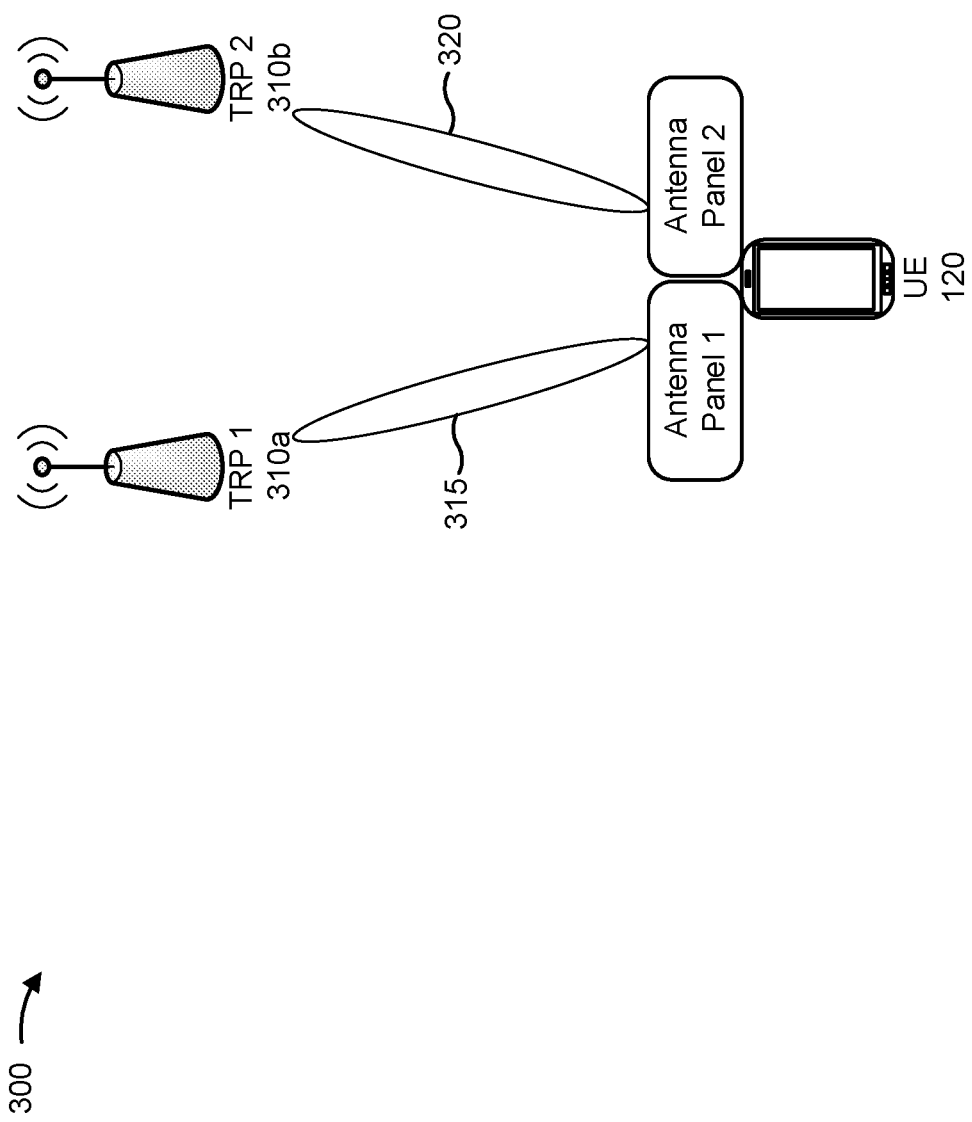
FIG. 3 is a diagram illustrating an example of a multi-panel uplink transmission, in accordance with various aspects of the present disclosure.

FIG. 3 is a diagram illustrating an example of a multi-panel uplink transmission 300, in accordance with various aspects of the present disclosure. As shown in FIG. 3, a UE 120 may communicate with a first transmit receive point (TRP) 310*a* and a second TRP 310*b*. The UE 120 may be a multi-panel device equipped with multiple antenna panels, such as a first antenna panel (antenna panel 1) and a second antenna panel (antenna panel 2), as depicted in FIG. 3.

In some aspects, an antenna panel may include multiple antenna components (for example, 16 antenna components or 32 antenna components). An antenna panel, for purposes of multi-panel operation, may include antenna components that are capable of independent control of a transmission beam relative to other antenna panels, that are capable of independently controlling transmission power relative to other antenna panels, or that have a common uplink transmission timing, among other examples.

As shown in FIG. 3, the UE 120 may transmit a multi-panel uplink transmission including a first uplink transmission 315 and a second uplink transmission 320. For example, the UE 120 may transmit the first uplink transmission 315 (for example, an uplink data transmission or an uplink control transmission) to the first TRP 310*a* using the first antenna panel of the UE 120. The UE 120 may transmit the second uplink transmission 320 (for example, an uplink data transmission or an uplink control transmission) to the second TRP 310*b* using the second antenna panel of the UE 120. In some aspects, the first uplink transmission 315 and the second uplink transmission 320 may be associated with the same information (for example, may carry the same data or the same uplink control information (UCI)). As described above, the UE 120 may transmit the first uplink transmission 315 using a first transmission beam or a first transmission power. The UE 120 may transmit the second uplink transmission 320 using a second transmission beam or a second transmission power. As a result, the UE 120 may be capable of using the multiple antenna panels for transmit diversity, uplink coverage enhancement, MIMO, or increasing throughput, among other examples.

In some aspects, the multi-panel uplink transmission may be a spatial division multiplexing (SDM) multi-panel uplink transmission or a frequency division multiplexing (FDM) multi-panel uplink transmission. In an SDM multi-panel uplink transmission, the first uplink transmission 315 and the second uplink transmission 320 may be associated with the same radio resources (for example, the same time domain resources and the same frequency domain resources), but different spatial information. For example, the first uplink transmission 315 may be associated with first spatial information (such as a first transmit beam, a first transmit direction, or a first uplink transmission configuration indicator (TCI) state, among other examples) and the second uplink transmission 320 may be associated with second spatial information (such as a second transmit beam, a second transmit direction, or a second uplink TCI state, among other examples). In an FDM multi-panel uplink transmission, the first uplink transmission 315 and the second uplink transmission 320 may be associated with the same time domain resources, but different frequency domain resources. For example, the first uplink transmission 315 may be associated with a first portion of a frequency domain resource allocation (FDRA) for the multi-panel uplink transmission (such as a first half of the FDRA) and the second uplink transmission 320 may be associated with a second portion of the FDRA for the multi-panel uplink transmission (such as a second half of the FDRA).

Figure 4:
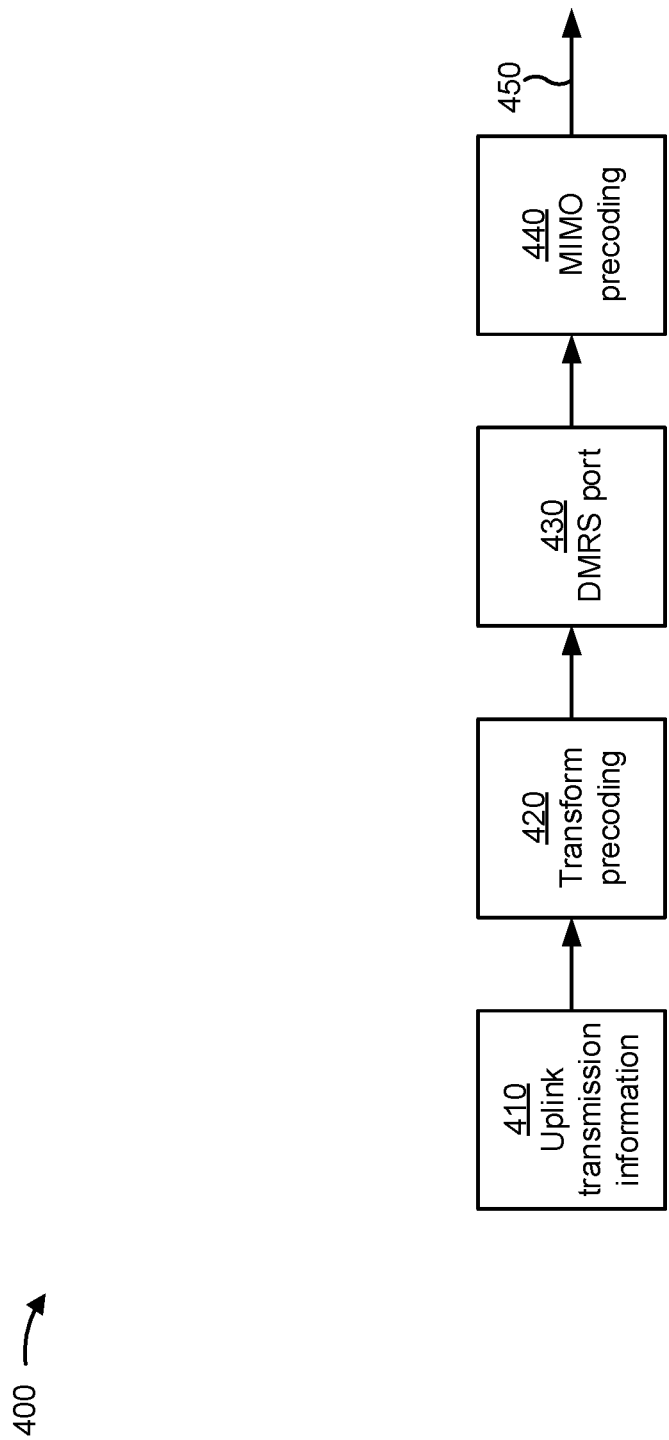
FIG. 4 is a diagram illustrating an example of a precoding procedure, in accordance with various aspects of the present disclosure.

FIG. 4 is a diagram illustrating an example of a precoding procedure 400, in accordance with various aspects of the present disclosure. The precoding procedure 400 may be associated with single layer uplink transmissions. In some aspects, the precoding procedure 400 may be a transform precoding procedure.

As shown in FIG. 4, in a first operation 410, the UE 120 may obtain uplink transmission information to be included in an uplink transmission. The uplink transmission information may include uplink data (for example, to be transmitted in a physical uplink shared channel (PUSCH) communication) or uplink control information (for example, to be transmitted in a physical uplink control channel (PUCCH) communication). In some aspects, the uplink transmission may be scheduled by a base station 110. In some aspects, the precoding procedure 400 may be indicated by the base station 110 (for example, when scheduling the uplink transmission or in another communication, such as a radio resource control (RRC) communication).

In a second operation 420, the UE 120 may perform a transform precoding procedure associated with the uplink transmission information. The transform precoding procedure may spread the uplink transmission information (for example, the uplink data). For example, the transform precoding procedure may be a discrete Fourier transform (DFT) procedure, such as a DFT spread OFDM (DFT-s-OFDM) transform precoding procedure (or a single carrier (SC) OFDM transform precoding procedure). In some aspects, a DFT size associated with the transform precoding procedure may be equal to a size of the FDRA associated with the uplink transmission. The transform precoding procedure may be used by the UE 120 to reduce a peak to average power ratio (PAPR) associated with the uplink transmission. Reducing the PAPR enables the UE 120 to utilize a power amplifier associated with the UE 120 more efficiently use power or to reduce a power consumption by the UE 120, among other examples.

In a third operation 430, the UE 120 may determine a demodulation reference signal (DMRS) port associated with the uplink transmission. The DMRS port may be used to transmit a DMRS associated with the uplink transmission. A DMRS may carry information used to estimate a radio channel for demodulation of an associated physical channel (for example, a PUCCH or PUSCH). The design and mapping of a DMRS may be specific to a physical channel for which the DMRS is used for estimation. DMRSs are UE-specific, can be beamformed, can be confined in a scheduled resource (for example, rather than transmitted on a wideband), and can be transmitted only when necessary. The UE 120 may determine a DMRS port associated with (for example, assigned to) the uplink transmission.

In a fourth operation 440, the UE 120 may perform one or more MIMO precoding procedures. A MIMO precoding procedure may be codebook based (for example, where the UE 120 determines a precoding matrix based at least in part on an indication from a base station 110) or non-codebook based (for example, where the UE 120 determines a precoding matrix based at least in part on one or more downlink channel measurements). For example, the UE 120 may determine a transmit precoder matrix indicator (TPMI) associated with the uplink transmission. The TPMI may indicate a precoder associated with the uplink transmission.

In some aspects, a MIMO precoding procedure may include determining a sounding reference signal (SRS) resource indicator (SRI) associated with the uplink transmission. The SRI may be used to identify one or more resources for an SRS associated with the uplink transmission. For example, an SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink channel state information (CSI) acquisition, downlink CSI acquisition for reciprocity-based operations, or uplink beam management, among other examples. The base station 110 may measure the SRSs, may perform channel estimation based at least in part on the measurements, and may use the SRS measurements to configure communications with the UE 120. The UE 120 may determine an SRS resource set associated with the uplink transmission based at least in part on the SRI.

In some aspects, a MIMO precoding procedure may include determining an uplink TCI state, spatial relation information, or a spatial transmit filter associated with the uplink transmission. A TCI state may indicate a directionality or a characteristic of an uplink beam, such as one or more quasi co-location (QCL) properties of the uplink beam. A QCL property may include, for example, a Doppler shift, a Doppler spread, an average delay, a delay spread, or spatial transmit/receive parameters, among other examples. The UE 120 may determine an uplink beam associated with the uplink transmission based at least in part on the uplink TCI state.

In a fifth operation 450, the UE 120 may transmit the uplink transmission based at least in part on performing one or more of the first through fourth operations described above. In some aspects, the UE 120 may transmit the uplink transmission using a single antenna panel. For example, the uplink transmission generated using the precoding procedure 400 may be a single layer, single antenna panel uplink transmission. In some aspects, the UE 120 may perform one or more other actions (such as scrambling, modulation, resource block (RB) mapping, or layer mapping, among other examples) in addition to, or in place of, one or more of the first through fourth operations described above.

In some aspects, a precoding procedure that includes transform precoding, such as the precoding procedure 400, may be applied to single layer uplink transmissions (for example, uplink communications transmitted using a single antenna panel of a UE 120) as a PAPR may be associated with a single antenna panel. A precoding procedure that includes transform precoding may be designed to satisfy a PAPR requirement of an antenna panel, as described above. To satisfy a PAPR requirement for an antenna panel of the UE 120, the precoding procedure may be limited to single layer and single antenna panel uplink transmissions.

However, in some cases, a UE 120 may support multi-panel operation (for example, a UE 120 may be capable of transmitting using multiple antenna panels, as described in connection with FIG. 3). A PAPR of a UE 120 that supports multi-panel operation may be determined on a per-antenna panel basis (for example, each antenna panel may be associated with a PAPR value or requirement). Therefore, a precoding procedure that includes transform precoding for only a single layer and a single antenna panel may be inapplicable to multi-panel uplink transmissions of the UE 120.

Various aspects relate generally to multi-panel uplink transmissions with precoding. Some aspects more specifically relate to multi-panel uplink transmissions that are generated using a precoding procedure that includes transform precoding. In some aspects, a UE 120 may receive an indication of precoding information associated with the multi-panel uplink transmission. In some aspects, the precoding information may include a quantity of layers associated with a multi-panel uplink transmission, an indication of one or more DMRS ports associated with a multi-panel uplink transmission, or MIMO precoding information (such as one or more SRIs, one or more TPMIs, or one or more uplink TCI states), among other examples. In some aspects, the UE 120 may generate the multi-panel uplink transmission in accordance with the precoding information (for example, by performing one or more precoding procedures based at least in part on the precoding information). The UE 120 may then transmit the multi-panel uplink transmission using multiple antenna panels.

Particular aspects of the subject matter described in this disclosure can be implemented to realize one or more of the following potential advantages. In some examples, the described techniques can be used to enable the UE 120 to perform precoding procedures (such as precoding procedures that includes transform precoding) associated with multi-panel uplink transmissions. The precoding procedures associated with multi-panel uplink transmissions may enable the UE 120 to exploit the independent PAPR of different antenna panels of the UE 120. This may improve a transmission efficiency associated with the precoding procedures (for example, when compared to precoding procedures that are limited to a single layer and a single antenna panel).

Figure 5:
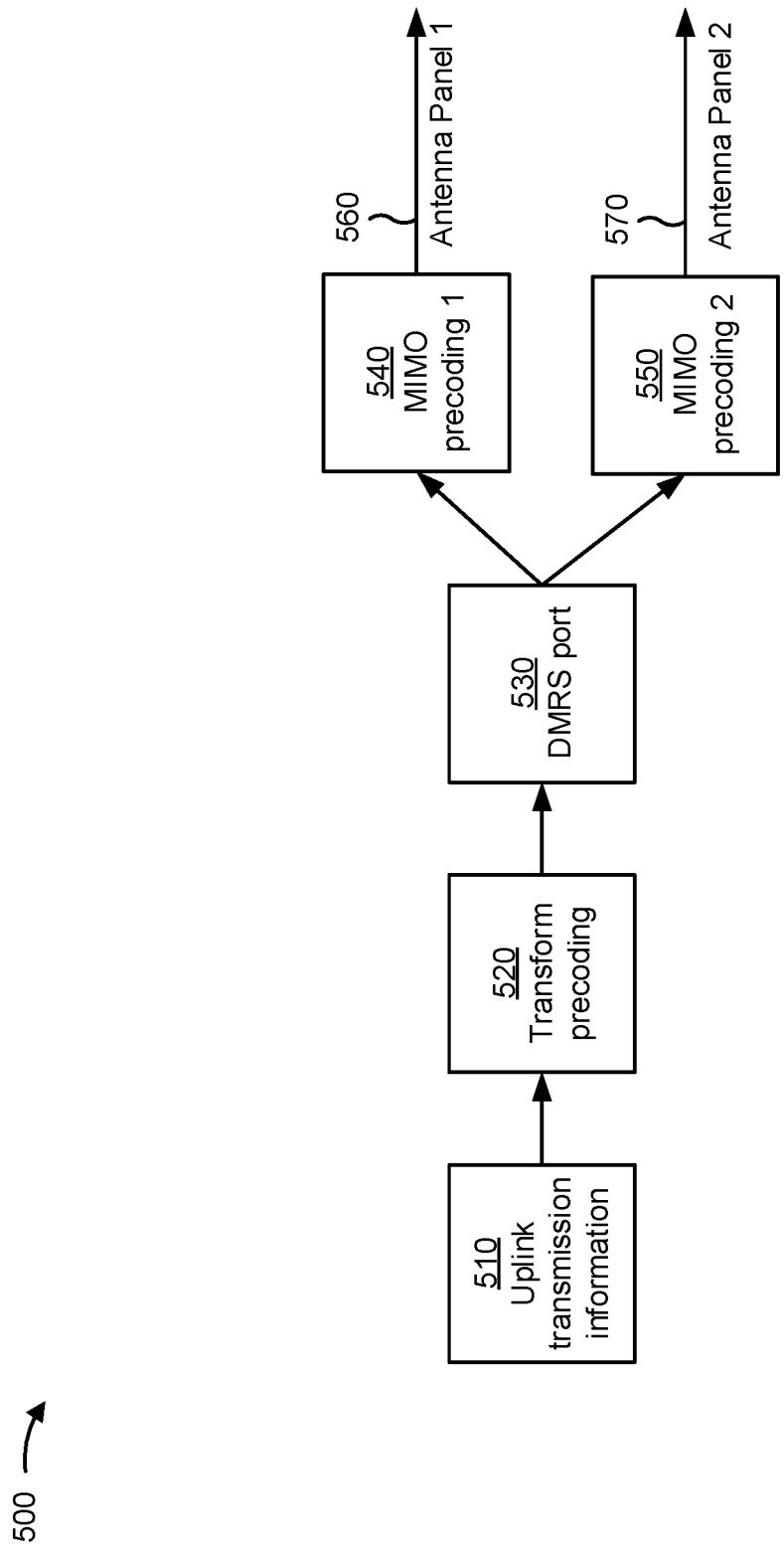
FIGS. 5-8 are diagrams illustrating examples of a multi-panel uplink transmission with precoding, in accordance with various aspects of the present disclosure.

FIG. 5 is a diagram illustrating an example of a multi-panel uplink transmission with precoding 500, in accordance with various aspects of the present disclosure. As shown in FIG. 5, a UE 120 may perform one or more operations to generate a multi-panel uplink transmission. In some aspects, the one or more operations may be indicated to the UE 120 by a base station 110 (for example, in a downlink control information (DCI) communication). For example, the base station 110 may determine precoding information, as described herein, associated with the multi-panel uplink transmission. The base station 110 may indicate the precoding information to the UE 120 in a DCI communication (for example, a DCI communication that schedules the multi-panel uplink communication or another DCI communication). In some aspects, a multi-panel uplink communication may include an uplink data communication (for example, a PUSCH communication) or an uplink control communication (for example, a PUCCH communication).

In some aspects, the multi-panel uplink communication may be a single layer uplink communication or a multiple (for example, two) layer uplink communication. In some aspects, the multi-panel uplink communication may be an FDM communication or a single frequency network (SFN) communication. For example, in some cases, a UE 120 may operate in an SFN. An SFN may be a network configuration in which multiple cells (for example, multiple base stations 110 or multiple cells associated with a single base station 110) simultaneously transmit the same signal over the same frequency channel. Similarly, a UE 120 in an SFN may simultaneously transmit the same signal over the same frequency channel. For example, an SFN may be a broadcast network. An SFN may enable an extended coverage area without the use of additional frequencies. For example, an SFN configuration may include a UE 120 in an SFN area that transmits one or more identical signals using the same frequency at the same, or substantially the same, time (for example, in an SFN multi-panel uplink transmission).

In a first operation 510, the UE 120 may receive scheduling information for a multi-panel uplink transmission for communicating uplink transmission information (for example, data or control information). The scheduling information may be indicated by a base station 110 to the UE 120 in a DCI communication. In some aspects, the DCI communication (or another downlink communication from the base station 110) may indicate precoding information associated with the multi-panel uplink transmission. For example, the base station 110 may indicate that the multi-panel uplink transmission is a single layer multi-panel uplink transmission. The base station 110 may indicate a DMRS port configuration (for example, indicating a DMRS port) associated with the multi-panel uplink transmission. The base station 110 may indicate a MIMO precoding configuration (for example, indicating one or more MIMO precoders, such as a SRI, a TPMI, or an uplink TCI state, among other examples) associated with the multi-panel uplink transmission.

In a second operation 520, the UE 120 may perform a transform precoding procedure indicated by the precoding information. In some aspects, the second operation 520 and the transform precoding procedure may be optional and not performed for some multi-panel uplink transmissions. The transform precoding procedure may include applying a DFT to the uplink transmission information. In some aspects, when the multi-panel uplink transmission is an FDM transmission, the size of a transform precoder (for example, a size of the DFT) may be based at least in part on a size of an FDRA associated with the multi-panel uplink transmission. For example, for FDM multi-panel uplink transmissions, a DFT size associated with the transform precoding procedure may be reduced to a portion of the FDRA (for example, half of the FDRA). In some aspects, when the multi-panel uplink transmission is an SFN transmission, the size of a transform precoder (for example, a size of the DFT) may be equal to the size of the FDRA. In some aspects, the transform precoding procedure may be applied to a single layer (for example, as the multi-panel uplink transmission may be a single layer multi-panel uplink transmission).

In a third operation 530, the UE 120 may determine (or identify) a DMRS port based at least in part on a DMRS port configuration indicated by the base station 110. For example, the precoding information indicated by the base station 110 may indicate that the multi-panel uplink transmission is associated with a single DMRS port. The UE 120 may map the single layer associated with the multi-panel uplink transmission to the DMRS port. That is, the multi-panel uplink transmission may be associated with a single DMRS. In some aspects, the DMRS port associated with the multi-panel uplink transmission may be not explicitly indicated. For example, a default DMRS port (such as DMRS port index 0) may be associated with the multi-panel uplink transmission.

In a fourth operation 540, the UE 120 may determine (or identify) a first MIMO precoder associated with the multi-panel uplink transmission based at least in part on the MIMO precoding configuration indicated by the base station 110. The first MIMO precoder may indicate a first beam (for example, a first uplink TCI state, first spatial relation information, or a first spatial transmit filter) associated with the multi-panel uplink transmission. The first MIMO precoder may indicate a first SRI (for example, when the multi-panel uplink transmission is a non-codebook based uplink transmission) or a first TPMI (for example, when the multi-panel uplink transmission is a codebook based uplink transmission) that indicates a digital MIMO transmit precoder associated with the multi-panel uplink transmission. In some aspects, the first MIMO precoder may be associated with a first antenna panel of the UE 120. The UE 120 may apply the first MIMO precoder to the single layer and the DMRS port associated with the multi-panel uplink transmission.

In a fifth operation 550, the UE 120 may determine (or identify) a second MIMO precoder associated with the multi-panel uplink transmission based at least in part on the MIMO precoding configuration indicated by the base station 110. The second MIMO precoder may indicate a second beam (for example, a second uplink TCI state, second spatial relation information, or a second spatial transmit filter) associated with the multi-panel uplink transmission. The second MIMO precoder may indicate a second SRI (for example, when the multi-panel uplink transmission is a non-codebook based uplink transmission) or a second TPMI (for example, when the multi-panel uplink transmission is a codebook based uplink transmission) that indicates a digital MIMO transmit precoder associated with the multi-panel uplink transmission. In some aspects, the second MIMO precoder may be associated with a second antenna panel of the UE 120. The UE 120 may apply the second MIMO precoder to the single layer and the DMRS port associated with the multi-panel uplink transmission. That is, the UE 120 may apply the second MIMO precoder to the same layer and the same DMRS port that the first MIMO precoder was applied to (for example, as described above in connection with the fourth operation 540).

In this way, the UE 120 may generate a first signal associated with the multi-panel uplink transmission for the first antenna panel of the UE 120 (for example, that uses a first beam, a first SRS resource set, or a first TPMI) and a second signal associated with the multi-panel uplink transmission for the second antenna panel of the UE 120 (for example, that uses a second beam, a second SRS resource set, or a second TPMI). The first signal and the second signal may be associated with a single layer and the same DMRS port of a PUSCH or a PUCCH.

In a sixth operation 560, the UE 120 may transmit, to a first TRP, the first signal associated with the multi-panel uplink transmission using the first antenna panel. In a seventh operation 570, the UE 120 may transmit, to a second TRP, the second signal associated with the multi-panel uplink transmission using the second antenna panel. As described above, the multi-panel uplink transmission may be an FDM transmission (for example, where the first signal and second signal are associated with the same time domain resources, but different frequency domain resources) or an SFN transmission (for example, where the first signal and second signal are associated with the same time domain resources and the same frequency domain resources). In some aspects, the UE 120 may perform one or more additional operations, in combination with, or in place of, one or more of the first through seventh operations described above, to generate the first signal and the second signal associated with the multi-panel uplink transmission, such as a scrambling operation, a modulation operation, a layer mapping operation, or a coding operation, among other examples.

Figure 6:
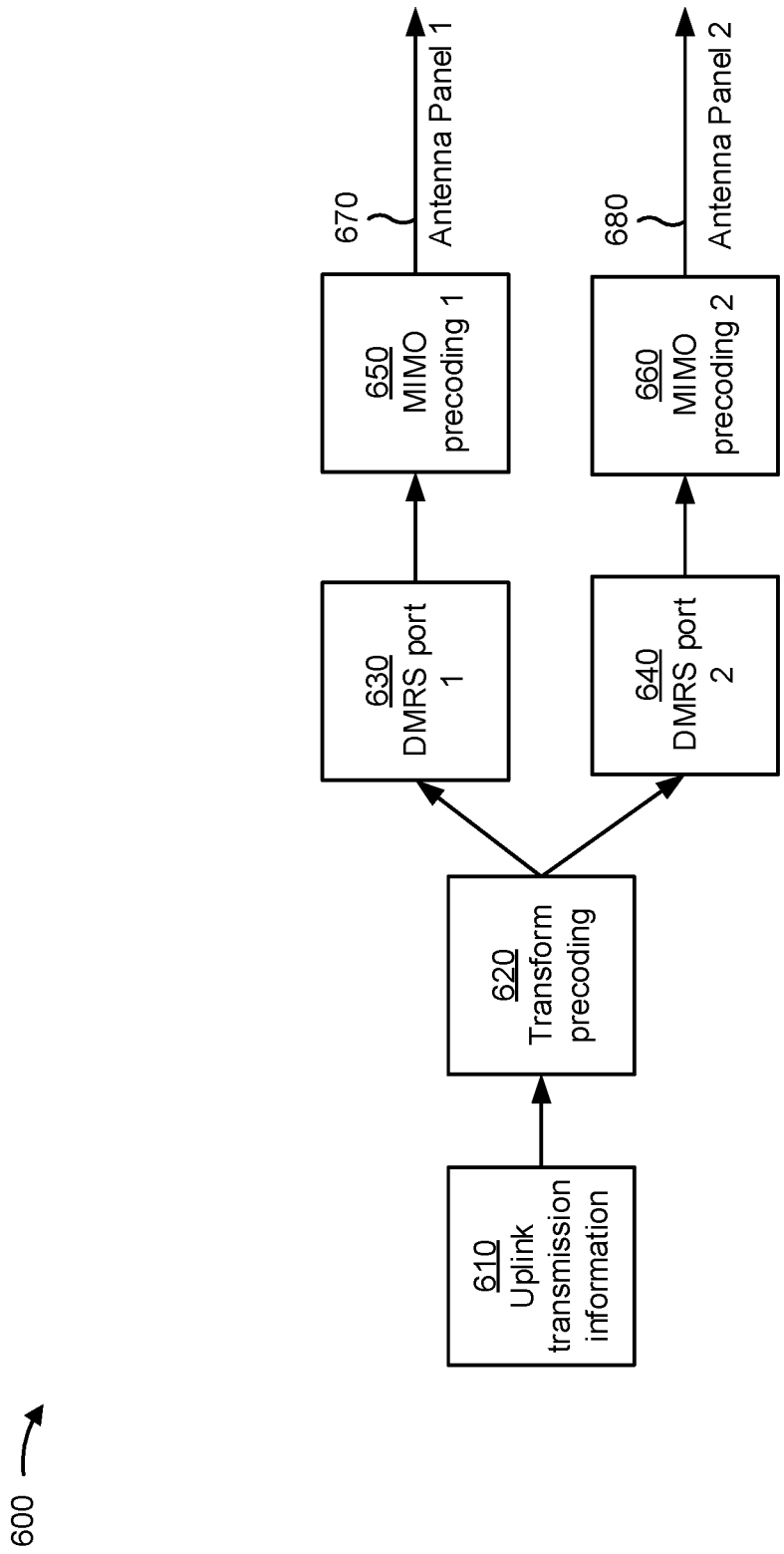

FIG. 6 is a diagram illustrating an example of a multi-panel uplink transmission with precoding 600, in accordance with various aspects of the present disclosure. As shown in FIG. 6, a UE 120 may perform one or more operations to generate a multi-panel uplink transmission. In some aspects, the one or more operations may be indicated to the UE 120 by a base station 110 (for example, in a DCI communication). For example, the base station 110 may determine precoding information, as described herein, associated with the multi-panel uplink transmission. The base station 110 may indicate the precoding information to the UE 120 in a DCI communication (for example, a DCI communication that schedules the multi-panel uplink communication or another DCI communication).

In some aspects, a multi-panel uplink communication may include an uplink data communication (for example, a PUSCH communication) or an uplink control communication (for example, a PUCCH communication). In some aspects, the multi-panel uplink transmission with precoding 600 may be associated with a single layer multi-panel uplink transmission. In some aspects, the multi-panel uplink transmission with precoding 600 may be an SFN multi-panel uplink transmission.

In a first operation 610, the UE 120 may receive scheduling information for a multi-panel uplink transmission for communicating uplink transmission information (for example, data or control information). The scheduling information may be indicated by a base station 110 to the UE 120 in a DCI communication. In some aspects, the DCI communication (or another downlink communication from the base station 110) may indicate precoding information associated with the multi-panel uplink transmission. For example, the base station 110 may indicate that the multi-panel uplink transmission is a single layer multi-panel uplink transmission. The base station 110 may indicate a DMRS port configuration (for example, indicating one or more DMRS ports) associated with the multi-panel uplink transmission. The base station 110 may indicate a MIMO precoding configuration (for example, indicating one or more MIMO precoders, such as one or more SRIs, one or more TPMIs, or one or more uplink TCI states, among other examples) associated with the multi-panel uplink transmission.

In a second operation 620, the UE 120 may perform a transform precoding procedure indicated by the precoding information. In some aspects, the second operation 620 and the transform precoding procedure may be optional and not performed for some multi-panel uplink transmissions. The transform precoding procedure may include applying a DFT to the uplink transmission information. In some aspects, the size of a transform precoder (for example, a size of the DFT) may be equal to the size of the FDRA (for example, as the multi-panel uplink transmission with precoding 600 may be an SFN transmission). In some aspects, the transform precoding procedure may be applied to a single layer (for example, as the multi-panel uplink transmission with precoding 600 may be a single layer multi-panel uplink transmission).

In a third operation 630, the UE 120 may determine (or identify) a first DMRS port based at least in part on a DMRS port configuration indicated by the base station 110. For example, the precoding information indicated by the base station 110 may indicate that the multi-panel uplink transmission is associated with multiple DMRS ports (for example, two DMRS ports). In some aspects, the DMRS ports may not be explicitly indicated. For example, multiple default DMRS ports may be associated with the multi-panel uplink transmission (for example, a DMRS port associated with an index 0 and a DMRS port associated with an index 2). The UE 120 may map the single layer associated with the multi-panel uplink transmission to the first DMRS port. The first DMRS port may be associated with generating a signal associated with the multi-panel uplink transmission for a first antenna panel of the UE 120.

In some aspects, the DMRS port configuration may indicate a first phase tracking reference signal (PTRS) associated with the first DMRS port. A PTRS may carry information used to compensate for oscillator phase noise. Typically, the phase noise increases as the oscillator carrier frequency increases. Thus, PTRS may be utilized at high carrier frequencies, such as millimeter wave frequencies, to mitigate phase noise. The PTRS may be used to track the phase of the local oscillator and to enable suppression of phase noise and common phase error (CPE). The UE 120 may determine (or identify) a first PTRS associated with the first DMRS port.

In a fourth operation 640, the UE 120 may determine (or identify) a second DMRS port based at least in part on a DMRS port configuration indicated by the base station 110. The UE 120 may map the single layer associated with the multi-panel uplink transmission to the second DMRS port. The second DMRS port may be associated with generating a signal associated with the multi-panel uplink transmission for a second antenna panel of the UE 120. In some aspects, the UE 120 may determine (or identify) a second PTRS associated with the second DMRS port.

In some aspects, the DMRS port configuration may indicate one or more DMRS code division multiplexing (CDM) groups associated with the first DMRS port and the second DMRS port. For example, the DMRS port configuration may indicate that the first DMRS port and the second DMRS port are associated with the same DMRS CDM group. In some aspects, the DMRS port configuration may indicate a first DMRS CDM group associated with the first DMRS port and a second DMRS CDM group associated with the second DMRS port. The UE 120 may determine (or identify) the DMRS CDM group(s) associated with the first DMRS port or the second DMRS port.

In a fifth operation 650, the UE 120 may determine (or identify) a first MIMO precoder associated with the multi-panel uplink transmission based at least in part on the MIMO precoding configuration indicated by the base station 110. The first MIMO precoder may indicate a first beam (for example, a first uplink TCI state, first spatial relation information, or a first spatial transmit filter) associated with the multi-panel uplink transmission. The first MIMO precoder may indicate a first SRI (for example, when the multi-panel uplink transmission is a non-codebook based uplink transmission) or a first TPMI (for example, when the multi-panel uplink transmission is a codebook based uplink transmission) that indicates a digital MIMO transmit precoder associated with the multi-panel uplink transmission. In some aspects, the first MIMO precoder may be associated with the first antenna panel of the UE 120. The UE 120 may apply the first MIMO precoder to the single layer and the first DMRS port associated with the multi-panel uplink transmission.

In a sixth operation 660, the UE 120 may determine (or identify) a second MIMO precoder associated with the multi-panel uplink transmission based at least in part on the MIMO precoding configuration indicated by the base station 110. The second MIMO precoder may indicate a second beam (for example, a second uplink TCI state or second spatial relation information) associated with the multi-panel uplink transmission. The second MIMO precoder may indicate a second SRI or a second TPMI associated with the multi-panel uplink transmission. In some aspects, the second MIMO precoder may be associated with the second antenna panel of the UE 120. The UE 120 may apply the second MIMO precoder to the single layer and the second DMRS port associated with the multi-panel uplink transmission.

In some aspects, the first MIMO precoder and the second MIMO precoder may be the same, or partially the same. For example, the first MIMO precoder and the second MIMO precoder may indicate the same SRI or the same TPMI (or only a single SRI or a single TPMI may be indicated by the MIMO precoding configuration, for example). If the first MIMO precoder and the second MIMO precoder indicate the same SRI, for example, the UE 120 may apply the SRI to the first DMRS port (for example, in connection with the fifth operation 650), and the UE 120 may apply the SRI to the second DMRS port (for example, in connection with the sixth operation 660).

In this way, the UE 120 may generate a first signal associated with the multi-panel uplink transmission for the first antenna panel of the UE 120 (for example, that uses a first DMRS port, a first beam, a first SRS resource set, or a first TPMI) and a second signal associated with the multi-panel uplink transmission for the second antenna panel of the UE 120 (for example, that uses a second DMRS port, a second beam, a second SRS resource set, or a second TPMI). The first signal and the second signal may be associated with a single layer and different DMRS ports. By generating the first signal and the second signal using separate DMRS ports, the UE 120 may improve channel estimation associated with the multi-panel uplink transmission. For example, as each signal may be associated with a DMRS, channel estimation may be performed for the first signal, transmitted using the first antenna panel, and for the second signal, transmitted using the second antenna panel, independently (for example, using the DMRS associated with each signal). In this way, channel estimation associated with the multi-panel uplink transmission may be improved.

In a seventh operation 670, the UE 120 may transmit, to a first TRP, the first signal associated with the multi-panel uplink transmission using the first antenna panel. In an eighth operation 680, the UE 120 may transmit, to a second TRP, the second signal associated with the multi-panel uplink transmission using the second antenna panel. As described above, the multi-panel uplink transmission may be an SFN transmission (for example, where the first signal and second signal are associated with the same time domain resources and the same frequency domain resources) that uses a single transmission port (for example, a single layer), but two DMRS ports.

In some aspects, the UE 120 may perform one or more additional operations, in combination with, or in place of, one or more of the first through eighth operations described above, to generate the first signal and the second signal associated with the multi-panel uplink transmission, such as a scrambling operation, a modulation operation, a layer mapping operation, or a coding operation, among other examples.

Figure 7:
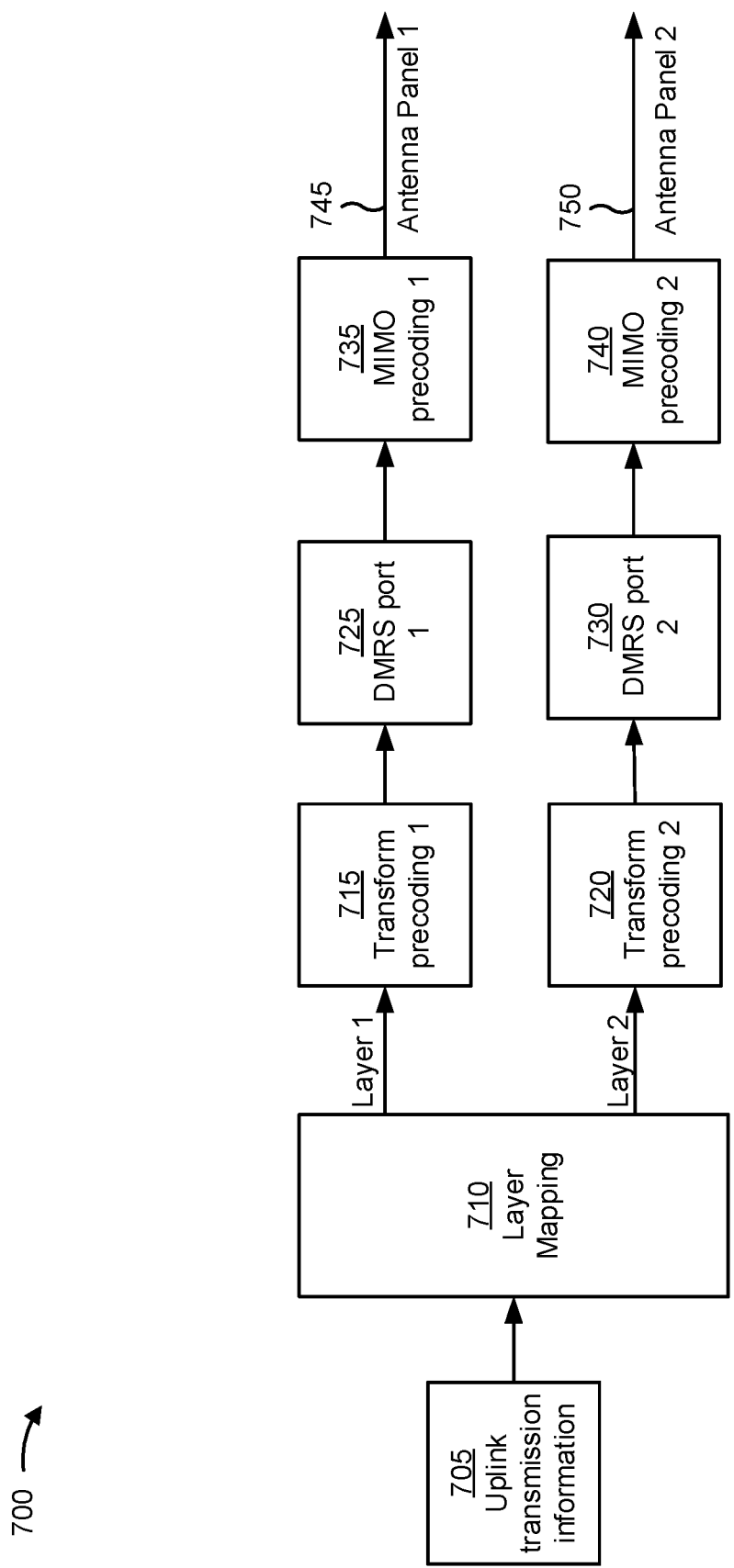

FIG. 7 is a diagram illustrating an example of a multi-panel uplink transmission with precoding 700, in accordance with various aspects of the present disclosure. As shown in FIG. 7, a UE 120 may perform one or more operations to generate a multi-panel uplink transmission. In some aspects, the one or more operations may be indicated to the UE 120 by a base station 110 (for example, in a DCI communication). For example, the base station 110 may determine precoding information, as described herein, associated with the multi-panel uplink transmission. The base station 110 may indicate the precoding information to the UE 120 in a DCI communication (for example, a DCI communication that schedules the multi-panel uplink communication or another DCI communication).

In some aspects, a multi-panel uplink communication may include an uplink data communication (for example, a PUSCH communication) or an uplink control communication (for example, a PUCCH communication). In some aspects, the multi-panel uplink transmission with precoding 700 may be associated with a multiple layer multi-panel uplink transmission (for example, multiple layer PUSCH communication or a multiple layer PUCCH communication).

In a first operation 705, the UE 120 may receive scheduling information for a multi-panel uplink transmission for communicating uplink transmission information (for example, data or control information). The scheduling information may be indicated by a base station 110 to the UE 120 in a DCI communication. In some aspects, the DCI communication (or another downlink communication from the base station 110) may indicate precoding information associated with the multi-panel uplink transmission. For example, the base station 110 may indicate that the multi-panel uplink transmission is a multiple layer multi-panel uplink transmission (for example, the base station 110 may indicate a quantity of layers associated with the multi-panel uplink transmission). The base station 110 may indicate a DMRS port configuration (for example, indicating one or more DMRS ports) associated with the multi-panel uplink transmission. The base station 110 may indicate a MIMO precoding configuration (for example, indicating one or more MIMO precoders, such as one or more SRIs, one or more TPMIs, or one or more uplink TCI states, among other examples) associated with the multi-panel uplink transmission.

In a second operation 710, the UE 120 may perform a layer mapping procedure to map the uplink transmission information to a first layer and to a second layer. In some aspects, the UE 120 may map the uplink transmission information to more than two layers (for example, three layers or four layers). Therefore, although the examples and operations described herein are described with respect to two layers, the examples and operations may similarly apply to a scenario in which the multi-panel uplink transmission includes more than two layers.

In a third operation 715, the UE 120 may perform a first transform precoding procedure indicated by the precoding information. In some aspects, the third operation 715 and the first transform precoding procedure may be optional and not performed for some multi-panel uplink transmissions. The first transform precoding procedure may include applying a first DFT to the uplink transmission information mapped to the first layer of the multi-panel uplink transmission.

In a fourth operation 720, the UE 120 may perform a second transform precoding procedure indicated by the precoding information. In some aspects, the fourth operation 720 and the second transform precoding procedure may be optional and not performed for some multi-panel uplink transmissions. The second transform precoding procedure may include applying a second DFT to the uplink transmission information mapped to the second layer of the multi-panel uplink transmission.

In some aspects, the first transform precoding procedure and the second transform precoding procedure may be the same transform precoding procedure (for example, the UE 120 may perform a transform precoding procedure associated with the first layer and may perform the same transform precoding procedure associated with the second layer). For example, the UE 120 may apply a DFT to the uplink transmission information mapped to the first layer of the multi-panel uplink transmission. The UE 120 may apply the same DFT to the uplink transmission information mapped to the second layer of the multi-panel uplink transmission. In some aspects, the first transform precoding procedure and the second transform precoding procedure may be different transform precoding procedures. For example, the UE 120 may apply a first DFT to the uplink transmission information mapped to the first layer of the multi-panel uplink transmission. The UE 120 may apply a second DFT to the uplink transmission information mapped to the second layer of the multi-panel uplink transmission.

In a fifth operation 725, the UE 120 may determine (or identify) a first DMRS port based at least in part on a DMRS port configuration indicated by the base station 110. For example, the precoding information indicated by the base station 110 may indicate that the multi-panel uplink transmission is associated with multiple DMRS ports (for example, two DMRS ports). In some aspects, the DMRS ports may not be explicitly indicated. For example, multiple default DMRS ports may be associated with the multi-panel uplink transmission (for example, a DMRS port associated with an index 0 and a DMRS port associated with an index 2). The UE 120 may map the first layer associated with the multi-panel uplink transmission to the first DMRS port. The first DMRS port may be associated with generating a signal associated with the multi-panel uplink transmission for a first antenna panel of the UE 120. In some aspects, the DMRS port configuration may indicate a first PTRS associated with the first DMRS port.

In a sixth operation 730, the UE 120 may determine (or identify) a second DMRS port based at least in part on a DMRS port configuration indicated by the base station 110. The UE 120 may map the second layer associated with the multi-panel uplink transmission to the second DMRS port. The second DMRS port may be associated with generating a signal associated with the multi-panel uplink transmission for a second antenna panel of the UE 120. In some aspects, the UE 120 may determine (or identify) a second PTRS associated with the second DMRS port.

In some aspects, the DMRS port configuration may indicate one or more DMRS CDM groups associated with the first DMRS port and the second DMRS port. For example, the DMRS port configuration may indicate that the first DMRS port and the second DMRS port are associated with the same DMRS CDM group. In some aspects, the DMRS port configuration may indicate a first DMRS CDM group associated with the first DMRS port and a second DMRS CDM group associated with the second DMRS port. The UE 120 may determine (or identify) the DMRS CDM group(s) associated with the first DMRS port or the second DMRS port.

In a seventh operation 735, the UE 120 may determine (or identify) a first MIMO precoder associated with the multi-panel uplink transmission based at least in part on the MIMO precoding configuration indicated by the base station 110. The first MIMO precoder may indicate a first beam (for example, a first uplink TCI state, first spatial relation information, or a first spatial transmit filter) associated with the multi-panel uplink transmission. The first MIMO precoder may indicate a first SRI (for example, when the multi-panel uplink transmission is a non-codebook based uplink transmission or a first TPMI (for example, when the multi-panel uplink transmission is a codebook based uplink transmission) that indicates a digital MIMO transmit precoder associated with the multi-panel uplink transmission. In some aspects, the first MIMO precoder may be associated with the first antenna panel of the UE 120. The UE 120 may apply the first MIMO precoder to the first layer and the first DMRS port associated with the multi-panel uplink transmission.

In an eighth operation 740, the UE 120 may determine (or identify) a second MIMO precoder associated with the multi-panel uplink transmission based at least in part on the MIMO precoding configuration indicated by the base station 110. The second MIMO precoder may indicate a second beam (for example, a second uplink TCI state, second spatial relation information, or a second spatial transmit filter)

associated with the multi-panel uplink transmission. The second MIMO precoder may indicate a second SRI or a second TPMI associated with the multi-panel uplink transmission. In some aspects, the second MIMO precoder may be associated with the second antenna panel of the UE 120. The UE 120 may apply the second MIMO precoder to the second layer and the second DMRS port associated with the multi-panel uplink transmission.

In some aspects, the first MIMO precoder and the second MIMO precoder may be the same, or partially the same. For example, the first MIMO precoder and the second MIMO precoder may indicate the same SRI or the same TPMI (or only a single SRI or a single TPMI may be indicated by the MIMO precoding configuration, for example). If the first MIMO precoder and the second MIMO precoder indicate the same SRI, for example, the UE 120 may apply the SRI to the first layer and the first DMRS port (for example, in connection with the seventh operation 735) and the UE 120 may apply the SRI to the second layer and the second DMRS port (for example, in connection with the eighth operation 740).

In this way, the UE 120 may generate a first signal associated with the multi-panel uplink transmission for the first antenna panel of the UE 120 (for example, that uses a first layer, a first DMRS port, a first beam, a first SRS resource set, or a first TPMI) and a second signal associated with the multi-panel uplink transmission for the second antenna panel of the UE 120 (for example, that uses a second layer, a second DMRS port, a second beam, a second SRS resource set, or a second TPMI). By generating the first signal and the second signal using separate layers, a capacity of the multi-panel uplink transmission may be improved. For example, by generating the first signal associated with the first layer of the multi-panel uplink transmission and the second signal associated with the second layer of the multi-panel uplink transmission, the UE 120 may transmit a larger quantity of information in the multi-panel uplink transmission.

In a ninth operation 745, the UE 120 may transmit, to a first TRP, the first signal associated with the multi-panel uplink transmission using the first antenna panel. In a tenth operation 750, the UE 120 may transmit, to a second TRP, the second signal associated with the multi-panel uplink transmission using the second antenna panel. As described above, the multi-panel uplink transmission may be an SFN transmission (for example, where the first signal and second signal are associated with the same time domain resources and the same frequency domain resources) that uses a single transmission port (for example, a single layer), but two DMRS ports.

In some aspects, the UE 120 may perform one or more additional operations, in combination with, or in place of, one or more of the first through eighth operations described above, to generate the first signal and the second signal associated with the multi-panel uplink transmission, such as a scrambling operation, a modulation operation, a layer mapping operation, or a coding operation, among other examples.

Figure 8:
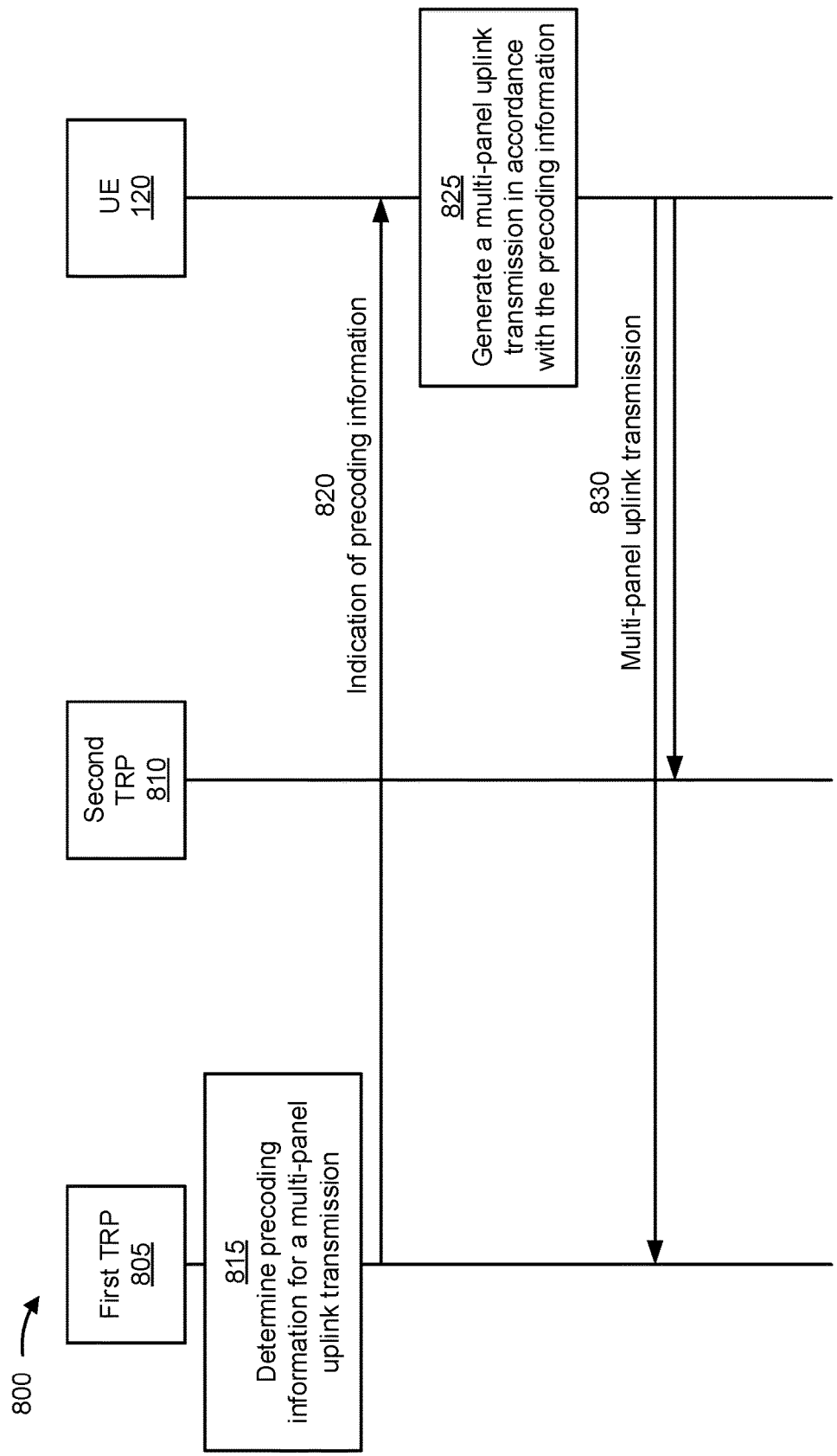

FIG. 8 is a diagram illustrating an example associated with a multi-panel uplink transmission with precoding 800, in accordance with various aspects of the present disclosure. As shown in FIG. 8, a UE 120 may communicate with multiple TRPs, such as a first TRP 805 and a second TRP 810. In some aspects, the first TRP 805 may be associated with a first base station 110, and the second TRP 810 may be associated with a second base station 110. In some aspects, the first TRP 805 and the second TRP 810 may be associated with the same base station 110.

In a first operation 815, the first TRP 805 (for example, a first base station 110) may determine precoding information associated with a multi-panel uplink transmission that is to be transmitted by the UE 120. The precoding information may include a DMRS port configuration associated with the multi-panel uplink transmission, a MIMO precoding configuration associated with the multi-panel uplink transmission, a quantity of layers associated with the multi-panel uplink transmission, or a transform precoding configuration associated with the multi-panel uplink transmission, among other examples. The precoding information may be the same, or similar to, the precoding information described above in connection with FIG. 5, 6, or 7.

In some aspects, the second TRP 810 (for example, a second base station 110) may determine the precoding information associated with the multi-panel uplink transmission that is to be transmitted by the UE 120. In some aspects, a third TRP (for example, a third base station 110 not depicted in FIG. 8) may determine the precoding information associated with the multi-panel uplink transmission that is to be transmitted by the UE 120.

In a second operation 820, the first TRP 805 (or the TRP that determines the precoding information) may transmit, to the UE 120, an indication of the precoding information associated with the multi-panel uplink transmission. In some aspects, the first TRP 805 may transmit the indication of the precoding information in a DCI communication. In some aspects, the DCI communication may include DCI that schedules the multi-panel uplink transmission. In some aspects, the DCI communication may be a separate DCI communication from the DCI communication that schedules the multi-panel uplink transmission. In some aspects, the first TRP 805 may transmit, to the UE 120, the indication of the precoding information (or a portion of the precoding information) associated with the multi-panel uplink transmission in a configuration, such as an RRC configuration. In such examples, the UE 120 may apply the precoding information (or the portion of the precoding information) to multiple (or all) multi-panel uplink communications transmitted by the UE 120. In some aspects, the first TRP 805 may transmit an indication of the precoding information to the second TRP 810.

In a third operation 825, the UE 120 may generate the multi-panel uplink transmission in accordance with the precoding information. The UE 120 may precode the multi-panel uplink transmission for transmission via a first antenna panel of the UE 102 and a second antenna panel of the UE 120 based at least in part on the precoding information. For example, the UE 120 may precode the multi-panel uplink transmission as described above in connection with FIG. 5, 6, or 7. The UE 120 may generate a first signal of the multi-panel uplink transmission associated with a first antenna panel of the UE 120 (for example, and a first layer, a first DMRS port, a first SRI, a first TPMI, or a first uplink TCI state). The UE 120 may generate a second signal of the multi-panel uplink transmission associated with a second antenna panel of the UE 120 (for example, and a second layer, a second DMRS port, a second SRI, a second TPMI, or a second uplink TCI state).

In a fourth operation 830, the UE 120 may transmit, to the first TRP 805 and the second TRP 810, the precoded multi-panel uplink transmission. For example, the UE 120 may transmit, to the first TRP 805, a first signal associated with the multi-panel uplink transmission using a first antenna panel of the UE 120. The UE 120 may transmit, to the second TRP 810, a second signal associated with the multi-panel uplink transmission using a second antenna panel of the UE 120. In some aspects, the multi-panel uplink transmission may be an FDM transmission or an SFN transmission, among other examples.

As a result, the UE 120 may be enabled to perform precoding procedures (such as precoding procedures that includes transform precoding) associated with multi-panel uplink transmissions. The precoding procedures associated with multi-panel uplink transmissions may enable the UE 120 to exploit the independent PAPR of different antenna panels of the UE 120. This may improve a transmission efficiency associated with the precoding procedures associated with multi-panel uplink transmissions (for example, when compared to precoding procedures that are limited to a single layer and a single antenna panel).

Figure 9:
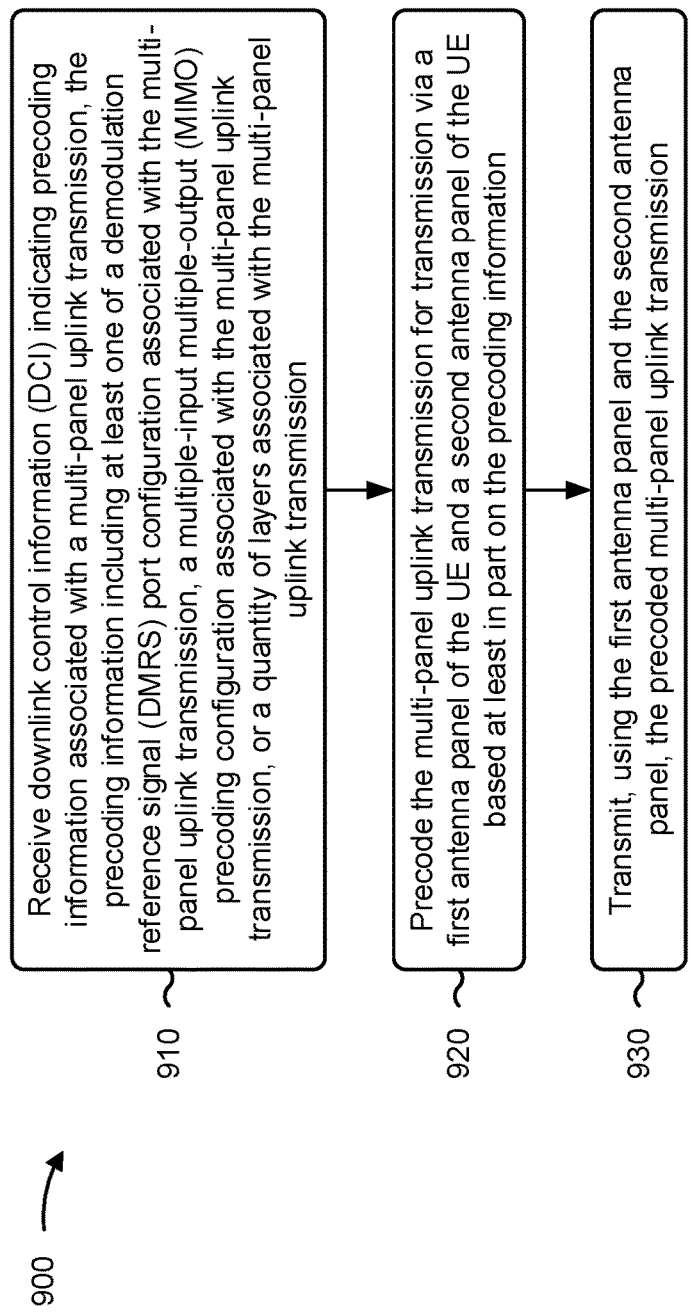
FIG. 9 is a flowchart illustrating an example process performed, for example, by a UE in accordance with various aspects of the present disclosure.

FIG. 9 is a flowchart illustrating an example process 900 performed, for example, by a UE in accordance with various aspects of the present disclosure. Example process 900 is an example where the UE (for example, UE 120) performs operations associated with multi-panel uplink transmissions with precoding.

As shown in FIG. 9, in some aspects, process 900 may include receiving DCI indicating precoding information associated with a multi-panel uplink transmission, the precoding information including at least one of a DMRS port configuration associated with the multi-panel uplink transmission, a MIMO precoding configuration associated with the multi-panel uplink transmission, or a quantity of layers associated with the multi-panel uplink transmission (block 910). For example, the UE (such as by using reception component 1102, depicted in FIG. 11) may receive DCI indicating precoding information associated with a multi-panel uplink transmission, the precoding information including at least one of a DMRS port configuration associated with the multi-panel uplink transmission, a MIMO precoding configuration associated with the multi-panel uplink transmission, or a quantity of layers associated with the multi-panel uplink transmission, as described above.

As further shown in FIG. 9, in some aspects, process 900 may include precoding the multi-panel uplink transmission for transmission via a first antenna panel of the UE and a second antenna panel of the UE based at least in part on the precoding information (block 920). For example, the UE (such as by using signal generation component 1110, depicted in FIG. 11) may precode the multi-panel uplink transmission for transmission via a first antenna panel of the UE and a second antenna panel of the UE based at least in part on the precoding information, as described above.

As further shown in FIG. 9, in some aspects, process 900 may include transmitting, using the first antenna panel and the second antenna panel, the precoded multi-panel uplink transmission (block 930). For example, the UE (such as by using transmission component 1106, depicted in FIG. 11) may transmit, using the first antenna panel and the second antenna panel, the precoded multi-panel uplink transmission, as described above.

Process 900 may include additional aspects, such as any single aspect or any combination of aspects described below or in connection with one or more other processes described elsewhere herein.

In a first additional aspect, the precoding information includes a transform precoding configuration associated with the multi-panel uplink transmission.

In a second additional aspect, alone or in combination with the first aspect, the MIMO precoding configuration indicates a first MIMO precoder associated with the first antenna panel and a second MIMO precoder associated with the second antenna panel.

In a third additional aspect, alone or in combination with one or more of the first and second aspects, the DMRS port configuration indicates a DMRS port associated with the multi-panel uplink transmission.

In a fourth additional aspect, alone or in combination with one or more of the first through third aspects, the MIMO precoding configuration indicates a first MIMO precoder associated with the first antenna panel and a DMRS port and a second MIMO precoder associated with the second antenna panel and the DMRS port.

In a fifth additional aspect, alone or in combination with one or more of the first through fourth aspects, the first MIMO precoder indicates at least one of a first uplink TCI state, a first SRI, or a first TPMI, and the second MIMO precoder indicates at least one of a second uplink TCI state, a second SRI, or a second TPMI.

In a sixth additional aspect, alone or in combination with one or more of the first through fifth aspects, receiving the DCI indicating the precoding information comprises receiving an indication that the quantity of layers associated with the multi-panel uplink transmission indicates that the multi-panel uplink transmission is associated with a single layer, the DMRS port configuration indicates a DMRS port associated with the multi-panel uplink transmission, and the MIMO precoding configuration indicates a first MIMO precoder associated with the first antenna panel and the DMRS port and a second MIMO precoder associated with the second antenna panel and the DMRS port.

In a seventh additional aspect, alone or in combination with one or more of the first through sixth aspects, precoding the multi-panel uplink transmission for transmission via the first antenna panel of the UE and the second antenna panel of the UE includes applying a first MIMO precoder, indicated by the MIMO precoding configuration, to a DMRS port, indicated by the DMRS port configuration, to generate the multi-panel uplink transmission for the first antenna panel, and applying a second MIMO precoder, indicated by the MIMO precoding configuration, to the DMRS port to generate the multi-panel uplink transmission for the second antenna panel.

In an eighth additional aspect, alone or in combination with one or more of the first through seventh aspects, transmitting the precoded multi-panel uplink transmission includes transmitting at least one of an SFN multi-panel uplink transmission or an FDM multi-panel uplink transmission.

In a ninth additional aspect, alone or in combination with one or more of the first through eighth aspects, the multi-panel uplink transmission is an FDM multi-panel uplink transmission, and the precoding information includes a transform precoding configuration that indicates a transform precoder size that is based at least in part on a size of a FDRA associated with the multi-panel uplink transmission.

In a tenth additional aspect, alone or in combination with one or more of the first through ninth aspects, the quantity of layers associated with the multi-panel uplink transmission indicates that the multi-panel uplink transmission is associated with a single layer.

In an eleventh additional aspect, alone or in combination with one or more of the first or second aspects, the DMRS port configuration indicates a first DMRS port associated with the multi-panel uplink transmission and a second DMRS port associated with the multi-panel uplink transmission.

In a twelfth additional aspect, alone or in combination with one or more of the first, second, or eleventh aspects, the quantity of layers associated with the multi-panel uplink transmission indicates that the multi-panel uplink transmission is associated with a single layer.

In a thirteenth additional aspect, alone or in combination with one or more of the first, second, eleventh, or twelfth aspects, the DMRS port configuration indicates that the first DMRS port is associated with the first antenna panel and that the second DMRS port is associated with the second antenna panel.

In a fourteenth additional aspect, alone or in combination with one or more of the first, second, or eleventh through thirteenth aspects, the DMRS port configuration indicates a first PTRS associated with the first DMRS port and a second PTRS associated with the second DMRS port.

In a fifteenth additional aspect, alone or in combination with one or more of the first, second, or eleventh through fourteenth aspects, the DMRS port configuration indicates that the first DMRS port and the second DMRS port are associated with the same DMRS CDM group.

In a sixteenth additional aspect, alone or in combination with one or more of the first, second, or eleventh through fourteenth aspects, the DMRS port configuration indicates that the first DMRS port is associated with a first DMRS CDM group and that the second DMRS port is associated with a second DMRS CDM group.

In a seventeenth additional aspect, alone or in combination with one or more of the first, second, or eleventh through sixteenth aspects, the MIMO precoding configuration indicates a first MIMO precoder associated with the first antenna panel and the first DMRS port, and a second MIMO precoder associated with the second antenna panel and the second DMRS port.

In an eighteenth additional aspect, alone or in combination with one or more of the first, second, or eleventh through seventeenth aspects, receiving the DCI indicating the precoding information includes receiving an indication that the quantity of layers associated with the multi-panel uplink transmission indicates that the multi-panel uplink transmission is associated with a single layer, and the DMRS port configuration indicates a first DMRS port associated with the multi-panel uplink transmission and a second DMRS port associated with the multi-panel uplink transmission.

In a nineteenth additional aspect, alone or in combination with one or more of the first, second, or eleventh through eighteenth aspects, the DMRS port configuration indicates that the first DMRS port and the second DMRS port are associated with the same DMRS CDM group or different DMRS CDM groups.

In a twentieth additional aspect, alone or in combination with one or more of the first, second, or eleventh through nineteenth aspects, precoding the multi-panel uplink transmission for transmission via the first antenna panel of the UE and the second antenna panel of the UE includes applying the first MIMO precoder to the first DMRS port to generate the multi-panel uplink transmission for the first antenna panel, and applying the second MIMO precoder to the second DMRS port to generate the multi-panel uplink transmission for the second antenna panel.

In a twenty-first additional aspect, alone or in combination with one or more of the first, second, or eleventh through twentieth aspects, transmitting the precoded multi-panel uplink transmission includes transmitting an SFN multi-panel uplink transmission.

In a twenty-second additional aspect, alone or in combination with one or more of the first or second aspects, the quantity of layers associated with the multi-panel uplink transmission indicates a first layer associated with the multi-panel uplink transmission and a second layer associated with the multi-panel uplink transmission.

In a twenty-third additional aspect, alone or in combination with one or more of the first, second, or twenty-second aspects, the DMRS port configuration indicates a first DMRS port associated with the first layer and a second DMRS port associated with the second layer.

In a twenty-fourth additional aspect, alone or in combination with one or more of the first, second, twenty-second, or twenty-third aspects, the DMRS port configuration indicates that the first DMRS port is associated with a first DMRS CDM group and that the second DMRS port is associated with a second DMRS CDM group.

In a twenty-fifth additional aspect, alone or in combination with one or more of the first, second, or twenty-second through twenty-fourth aspects, the MIMO precoding configuration indicates a first MIMO precoder associated with the first antenna panel and the first layer, and a second MIMO precoder associated with the second antenna panel and the second layer.

In a twenty-sixth additional aspect, alone or in combination with one or more of the first, second, or twenty-second through twenty-fifth aspects, receiving the DCI indicating the precoding information includes receiving an indication that the quantity of layers associated with the multi-panel uplink transmission indicates a first layer associated with the multi-panel uplink transmission and a second layer associated with the multi-panel uplink transmission, and the DMRS port configuration indicates a first DMRS port associated with the first layer and a first DMRS CDM group and a second DMRS port associated with the second layer and a second DMRS CDM group.

In a twenty-seventh additional aspect, alone or in combination with one or more of the first, second, or twenty-second through twenty-sixth aspects, precoding the multi-panel uplink transmission for transmission via the first antenna panel of the UE and the second antenna panel of the UE includes mapping the multi-panel uplink transmission to the first layer and the second layer, applying the first MIMO precoder to the first DMRS port and the first layer to generate the multi-panel uplink transmission for the first antenna panel, and applying the second MIMO precoder to the second DMRS port and the second layer to generate the multi-panel uplink transmission for the second antenna panel.

In a twenty-eighth additional aspect, alone or in combination with one or more of the first, second, or twenty-second through twenty-seventh aspects, precoding the multi-panel uplink transmission for transmission via the first antenna panel of the UE and the second antenna panel of the UE includes applying a first transform precoder to the first layer to generate the multi-panel uplink transmission for the first antenna panel, and applying a second transform precoder to the second layer to generate the multi-panel uplink transmission for the second antenna panel.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
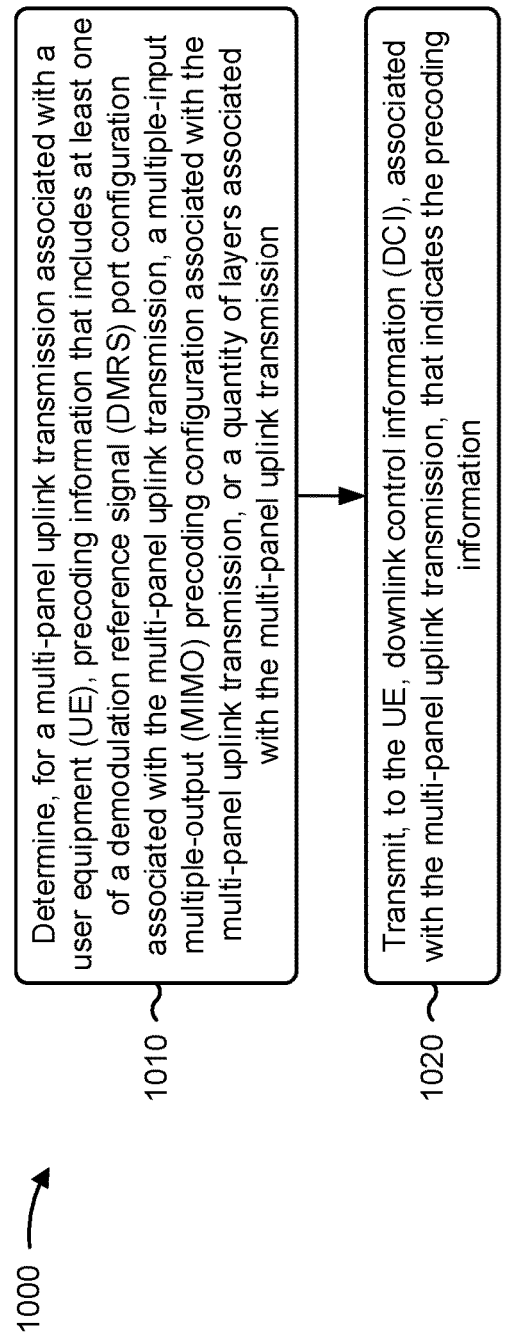
FIG. 10 is a flowchart illustrating an example process performed, for example, by a base station in accordance with various aspects of the present disclosure.

FIG. 10 is a flowchart illustrating an example process 1000 performed, for example, by a base station in accordance with various aspects of the present disclosure. Example process 1000 is an example where the base station (for example, base station 110) performs operations associated with multi-panel uplink transmissions with precoding.

As shown in FIG. 10, in some aspects, process 1000 may include determining, for a multi-panel uplink transmission associated with a UE, precoding information that includes at least one of a DMRS port configuration associated with the multi-panel uplink transmission, a MIMO precoding configuration associated with the multi-panel uplink transmission, or a quantity of layers associated with the multi-panel uplink transmission (block 1010). For example, the base station (such as by using determination component 1210, depicted in FIG. 12) may determine, for a multi-panel uplink transmission associated with a UE, precoding information that includes at least one of a DMRS port configuration associated with the multi-panel uplink transmission, a MIMO precoding configuration associated with the multi-panel uplink transmission, or a quantity of layers associated with the multi-panel uplink transmission, as described above.

As further shown in FIG. 10, in some aspects, process 1000 may include transmitting, to the UE, DCI, associated with the multi-panel uplink transmission, that indicates the precoding information (block 1020). For example, the base station (such as by using transmission component 1206, depicted in FIG. 12) may transmit, to the UE, DCI, associated with the multi-panel uplink transmission, that indicates the precoding information, as described above.

Process 1000 may include additional aspects, such as any single aspect or any combination of aspects described below or in connection with one or more other processes described elsewhere herein.

In a first additional aspect, process 1000 includes receiving, from the UE, the multi-panel uplink transmission that was precoded by the UE based at least in part on the precoding information.

In a second additional aspect, alone or in combination with the first aspect, determining the precoding information includes determining a transform precoding configuration associated with the multi-panel uplink transmission.

In a third additional aspect, alone or in combination with one or more of the first and second aspects, determining the precoding information includes determining that the MIMO precoding configuration includes a first MIMO precoder associated with a first antenna panel of the UE and a second MIMO precoder associated with a second antenna panel of the UE.

In a fourth additional aspect, alone or in combination with one or more of the first through third aspects, determining the precoding information includes determining that the DMRS port configuration includes a DMRS port of the UE associated with the multi-panel uplink transmission.

In a fifth additional aspect, alone or in combination with one or more of the first through fourth aspects, determining the precoding information includes determining that the MIMO precoding configuration includes a first MIMO precoder associated with a first antenna panel of the UE and a DMRS port of the UE and a second MIMO precoder associated with a second antenna panel of the UE and the DMRS port of the UE.

In a sixth additional aspect, alone or in combination with one or more of the first through fifth aspects, determining the precoding information includes determining that: the first MIMO precoder includes at least one of a first uplink TCI state, a first SRI, or a first TPMI, and the second MIMO precoder includes at least one of a second uplink TCI state, a second SRI, or a second TPMI.

In a seventh additional aspect, alone or in combination with one or more of the first through sixth aspects, process 1000 includes receiving the multi-panel uplink transmission as at least one of an SFN multi-panel uplink transmission or an FDM multi-panel uplink transmission.

In an eighth additional aspect, alone or in combination with one or more of the first through seventh aspects, the multi-panel uplink transmission is an FDM multi-panel uplink transmission, and determining the precoding information includes determining a transform precoder size associated with the multi-panel uplink transmission based at least in part on a size of a FDRA associated with the multi-panel uplink transmission.

In a ninth additional aspect, alone or in combination with one or more of the first through eighth aspects, the quantity of layers associated with the multi-panel uplink transmission indicates that the multi-panel uplink transmission is associated with a single layer.

In a tenth additional aspect, alone or in combination with one or more of the first through third aspects, determining the precoding information includes determining that the DMRS port configuration includes a first DMRS port of the UE associated with the multi-panel uplink transmission and a second DMRS port of the UE associated with the multi-panel uplink transmission.

In an eleventh additional aspect, alone or in combination with one or more of the first through third or tenth aspects, determining the precoding information includes determining that the multi-panel uplink transmission is associated with a single layer.

In a twelfth additional aspect, alone or in combination with one or more of the first through third, tenth, or eleventh aspects, determining the precoding information includes determining that the first DMRS port is associated with a first antenna panel of the UE and that the second DMRS port is associated with a second antenna panel of the UE.

In a thirteenth additional aspect, alone or in combination with one or more of the first through third or tenth through twelfth aspects, determining the precoding information includes determining a first PTRS associated with the first DMRS port and a second PTRS associated with the second DMRS port.

In a fourteenth additional aspect, alone or in combination with one or more of the first through third or tenth through thirteenth aspects, determining the precoding information includes determining a DMRS CDM group associated with the first DMRS port and associated with the second DMRS port.

In a fifteenth additional aspect, alone or in combination with one or more of the first through third or tenth through fourteenth aspects, determining the precoding information includes determining a first DMRS CDM group associated with the first DMRS port, and determining a second DMRS CDM group associated with the second DMRS port.

In a sixteenth additional aspect, alone or in combination with one or more of the first through third or tenth through fifteenth aspects, determining the precoding information includes determining that the MIMO precoding configuration includes a first MIMO precoder associated with a first antenna panel of the UE and a first DMRS port of the UE, and a second MIMO precoder associated with a second antenna panel of the UE and a second DMRS port of the UE.

In a seventeenth additional aspect, alone or in combination with one or more of the first through third or tenth through sixteenth aspects, process 1000 includes receiving the multi-panel uplink transmission as an SFN multi-panel uplink transmission.

In an eighteenth additional aspect, alone or in combination with one or more of the first through third aspects, determining the precoding information includes determining that the multi-panel uplink transmission includes a first layer and a second layer.

In a nineteenth additional aspect, alone or in combination with one or more of the first through third or eighteenth aspects, determining the precoding information includes determining that the DMRS port configuration includes a first DMRS port of the UE associated with the first layer and a second DMRS port of the UE associated with the second layer.

In a twentieth additional aspect, alone or in combination with one or more of the first through third, eighteenth or nineteenth aspects, determining the precoding information includes determining a first DMRS CDM group associated with the first DMRS port, and determining a second DMRS CDM group associated with the second DMRS port.

In a twenty-first additional aspect, alone or in combination with one or more of the first through third or eighteenth through twentieth aspects, determining the precoding information includes that the MIMO precoding configuration includes a first MIMO precoder associated with a first antenna panel of the UE and the first layer, and a second MIMO precoder associated with a second antenna panel of the UE and the second layer.

In a twenty-second additional aspect, alone or in combination with one or more of the first through third or eighteenth through twenty-first aspects, determining the precoding information includes determining a first transform precoder associated with the first layer, and determining a second transform precoder associated with the second layer.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
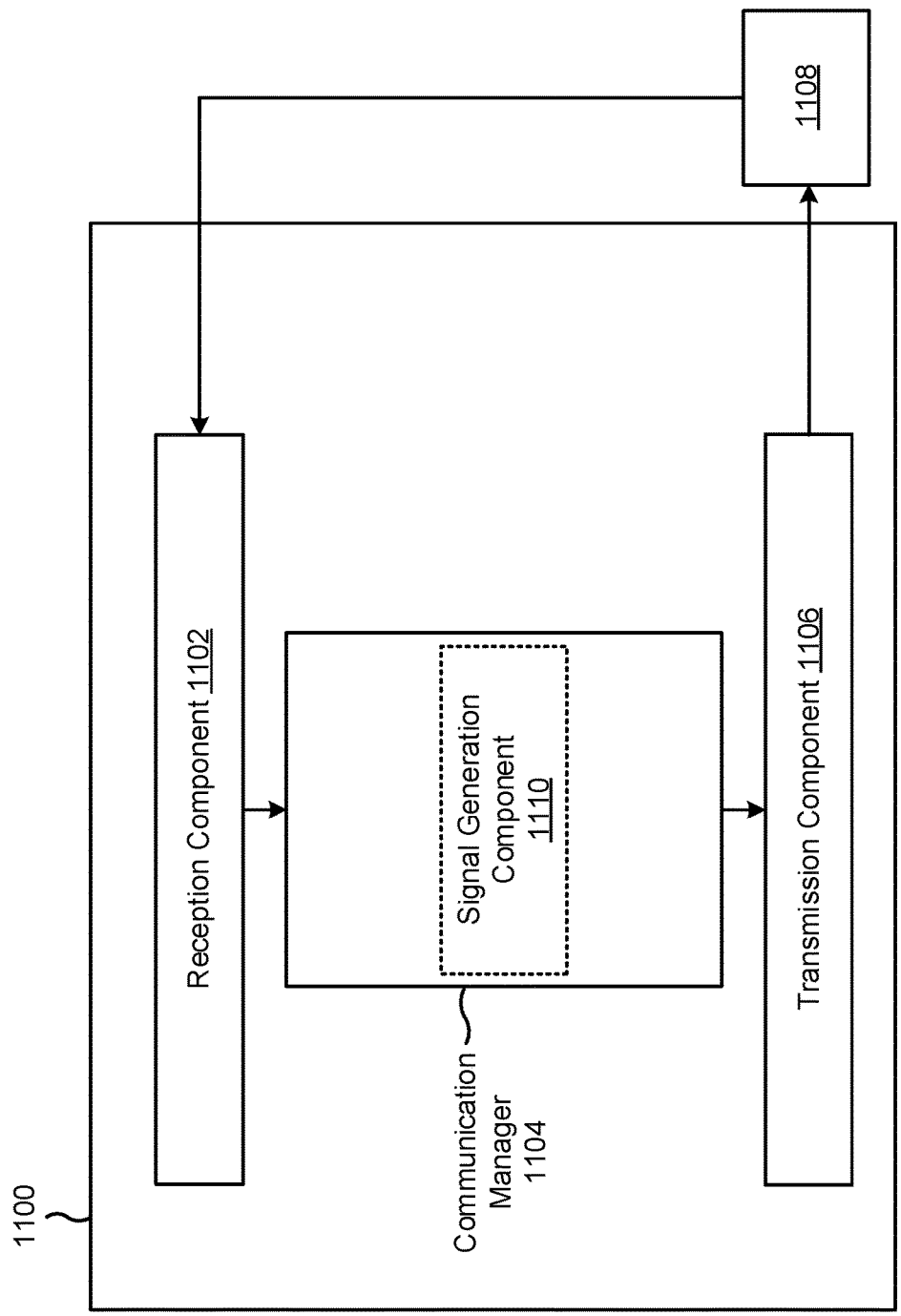
FIGS. 11 and 12 are block diagrams of example apparatuses for wireless communication in accordance with various aspects of the present disclosure.

FIG. 11 is a block diagram of an example apparatus 1100 for wireless communication in accordance with various aspects of the present disclosure. The apparatus 1100 may be a UE, or a UE may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 5-8. Additionally or alternatively, the apparatus 1100 may be configured to perform one or more processes described herein, such as process 900 of FIG. 9. In some aspects, the apparatus 1100 may include one or more components of the UE described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the UE described above in connection with FIG. 2. In some aspects, the transmission component 1106 may be co-located with the reception component 1102 in a transceiver.

The communication manager 1104 may receive or may cause the reception component 1102 to receive DCI indicating precoding information associated with a multi-panel uplink transmission, the precoding information including at least one of a DMRS port configuration associated with the multi-panel uplink transmission, a MIMO precoding configuration associated with the multi-panel uplink transmission, or a quantity of layers associated with the multi-panel uplink transmission. The communication manager 1104 may precode the multi-panel uplink transmission for transmission via a first antenna panel of the UE and a second antenna panel of the UE based at least in part on the precoding information. The communication manager 1104 may transmit or may cause the transmission component 1106 to transmit, using the first antenna panel and the second antenna panel, the precoded multi-panel uplink transmission. In some aspects, the communication manager 1104 may perform one or more operations described elsewhere herein as being performed by one or more components of the communication manager 1104.

The communication manager 1104 may include a controller/processor, a memory, or a combination thereof, of the UE described above in connection with FIG. 2. In some aspects, the communication manager 1104 includes a set of components, such as a signal generation component 1110. Alternatively, the set of components may be separate and distinct from the communication manager 1104. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive DCI indicating precoding information associated with a multi-panel uplink transmission, the precoding information including at least one of a DMRS port configuration associated with the multi-panel uplink transmission, a MIMO precoding configuration associated with the multi-panel uplink transmission, or a quantity of layers associated with the multi-panel uplink transmission. The signal generation component 1110 may precode the multi-panel uplink transmission for transmission via a first antenna panel of the UE and a second antenna panel of the UE based at least in part on the precoding information. The transmission component 1106 may transmit, using the first antenna panel and the second antenna panel, the precoded multi-panel uplink transmission.

In some aspects, the reception component 1102 may receive an indication that the quantity of layers associated with the multi-panel uplink transmission indicates that the multi-panel uplink transmission is associated with a single layer, the DMRS port configuration indicates a DMRS port associated with the multi-panel uplink transmission, and the MIMO precoding configuration indicates a first MIMO precoder associated with the first antenna panel and the DMRS port and a second MIMO precoder associated with the second antenna panel and the DMRS port.

In some aspects, the reception component 1102 may receive an indication that the quantity of layers associated with the multi-panel uplink transmission indicates that the multi-panel uplink transmission is associated with a single layer, and the DMRS port configuration indicates a first DMRS port associated with the multi-panel uplink transmission and a second DMRS port associated with the multi-panel uplink transmission.

In some aspects, the reception component 1102 may receive an indication that the quantity of layers associated with the multi-panel uplink transmission indicates a first layer associated with the multi-panel uplink transmission and a second layer associated with the multi-panel uplink transmission, and the DMRS port configuration indicates a first DMRS port associated with the first layer and a first DMRS CDM group and a second DMRS port associated with the second layer and a second DMRS CDM group.

In some aspects, the signal generation component 1110 may apply a first MIMO precoder, indicated by the MIMO precoding configuration, to a DMRS port, indicated by the DMRS port configuration, to generate the multi-panel uplink transmission for the first antenna panel. In some aspects, the signal generation component 1110 may apply a second MIMO precoder, indicated by the MIMO precoding configuration, to the DMRS port to generate the multi-panel uplink transmission for the second antenna panel.

In some aspects, the signal generation component 1110 may apply the first MIMO precoder to the first DMRS port to generate the multi-panel uplink transmission for the first antenna panel. In some aspects, the signal generation component 1110 may apply the second MIMO precoder to the second DMRS port to generate the multi-panel uplink transmission for the second antenna panel.

In some aspects, the signal generation component 1110 may map the multi-panel uplink transmission to the first layer and the second layer. In some aspects, the signal generation component 1110 may apply the first MIMO precoder to the first DMRS port and the first layer to generate the multi-panel uplink transmission for the first antenna panel. In some aspects, the signal generation component 1110 may apply the second MIMO precoder to the second DMRS port and the second layer to generate the multi-panel uplink transmission for the second antenna panel.

In some aspects, the signal generation component 1110 may apply a first transform precoder to the first layer to generate the multi-panel uplink transmission for the first antenna panel. In some aspects, the signal generation component 1110 may apply a second transform precoder to the second layer to generate the multi-panel uplink transmission for the second antenna panel.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
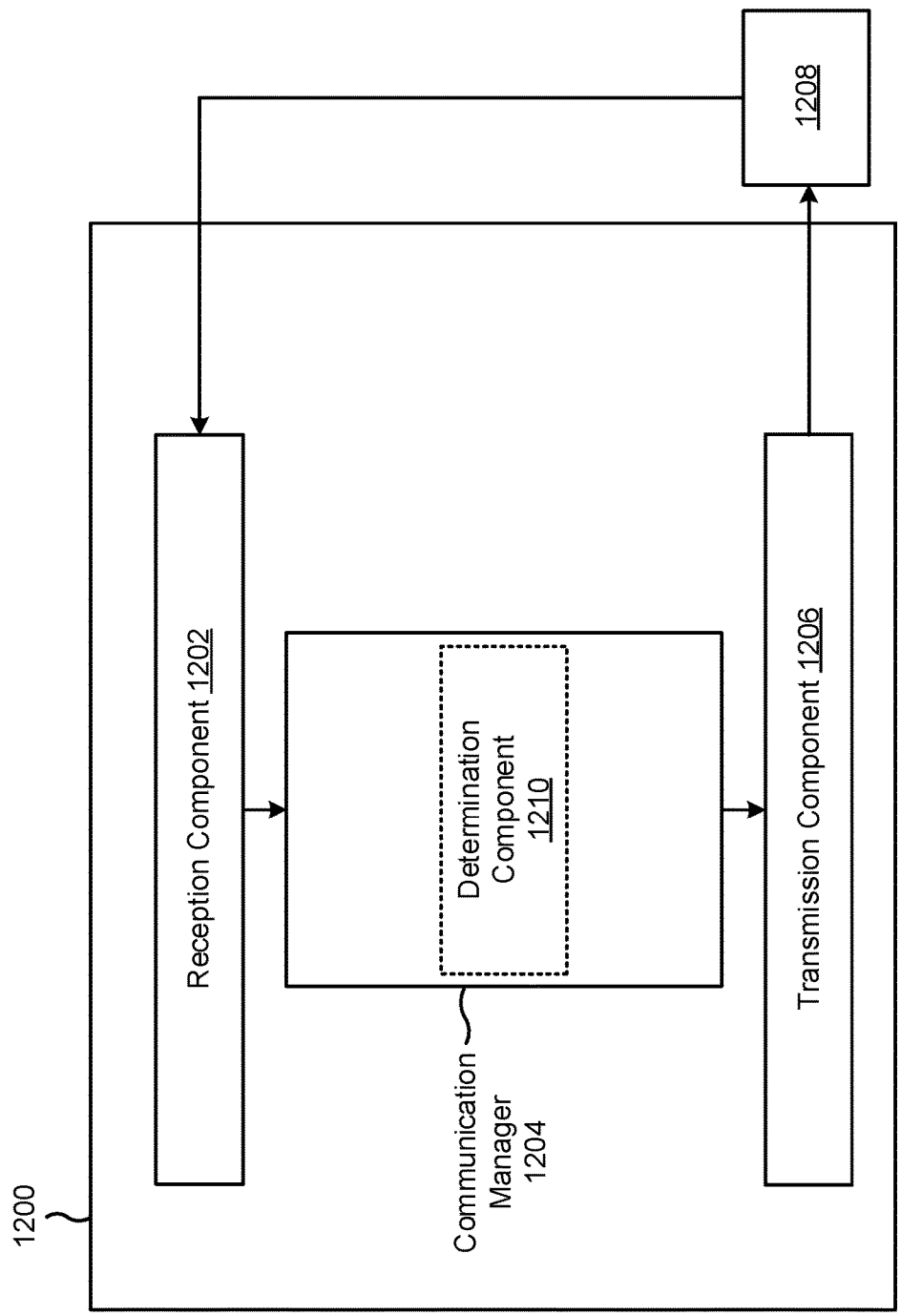

FIG. 12 is a block diagram of an example apparatus 1200 for wireless communication in accordance with various aspects of the present disclosure. The apparatus 1200 may be a base station, or a base station may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIGS. 5-8. Additionally or alternatively, the apparatus 1200 may be configured to perform one or more processes described herein, such as process 1000 of FIG. 10. In some aspects, the apparatus 1200 may include one or more components of the base station described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the base station described above in connection with FIG. 2. In some aspects, the transmission component 1206 may be co-located with the reception component 1202 in a transceiver.

The communication manager 1204 may determine, for a multi-panel uplink transmission associated with a UE, precoding information that includes at least one of a DMRS port configuration associated with the multi-panel uplink transmission, a MIMO precoding configuration associated with the multi-panel uplink transmission, or a quantity of layers associated with the multi-panel uplink transmission. The communication manager 1204 may transmit or may cause the transmission component 1206 to transmit, to the UE, DCI, associated with the multi-panel uplink transmission, that indicates the precoding information. In some aspects, the communication manager 1204 may perform one or more operations described elsewhere herein as being performed by one or more components of the communication manager 1204.

The communication manager 1204 may include a controller/processor, a memory, a scheduler, a communication unit, or a combination thereof, of the base station described above in connection with FIG. 2. In some aspects, the communication manager 1204 includes a set of components, such as a determination component 1210. Alternatively, the set of components may be separate and distinct from the communication manager 1204. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 1210 may determine, for a multi-panel uplink transmission associated with a UE, precoding information that includes at least one of a DMRS port configuration associated with the multi-panel uplink transmission, a MIMO precoding configuration associated with the multi-panel uplink transmission, or a quantity of layers associated with the multi-panel uplink transmission. The transmission component 1206 may transmit, to the UE, DCI, associated with the multi-panel uplink transmission, that indicates the precoding information.

The reception component 1202 may receive, from the UE, the multi-panel uplink transmission in accordance with the precoding information. The reception component 1202 may receive the multi-panel uplink transmission as at least one of an SFN multi-panel uplink transmission or an FDM multi-panel uplink transmission.

The determination component 1210 may determine a first DMRS CDM group associated with the first DMRS port. The determination component 1210 may determine a second DMRS CDM group associated with the second DMRS port. The determination component 1210 may determine a first transform precoder associated with the first layer. The determination component 1210 may determine a second transform precoder associated with the second layer.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or combinations thereof.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A method of wireless communication performed by a user equipment (UE), comprising:
   receiving downlink control information (DCI) indicating precoding information associated with a multi-panel uplink transmission, the precoding information including at least one of a demodulation reference signal (DMRS) port configuration associated with the multi-panel uplink transmission, a multiple-input multiple-output (MIMO) precoding configuration associated with the multi-panel uplink transmission, or a quantity of layers associated with the multi-panel uplink transmission;
   precoding the multi-panel uplink transmission for transmission via a first antenna panel of the UE and a second antenna panel of the UE based at least in part on the precoding information; and
   transmitting, using the first antenna panel and the second antenna panel, the precoded multi-panel uplink transmission,
      wherein transmitting the precoded multi-panel uplink transmission comprises transmitting a single frequency network (SFN) multi-panel uplink transmission.

2. The method of claim 1, wherein the precoding information includes a transform precoding configuration associated with the multi-panel uplink transmission.

3. The method of claim 1, wherein receiving the DCI indicating the precoding information comprises receiving an indication that:
   the quantity of layers associated with the multi-panel uplink transmission indicates that the multi-panel uplink transmission is associated with a single layer,
   the DMRS port configuration indicates a DMRS port associated with the multi-panel uplink transmission, and
   the MIMO precoding configuration indicates a first MIMO precoder associated with the first antenna panel and the DMRS port and a second MIMO precoder associated with the second antenna panel and the DMRS port.

4. The method of claim 1, wherein precoding the multi-panel uplink transmission for transmission via the first antenna panel of the UE and the second antenna panel of the UE comprises:
   applying a first MIMO precoder, indicated by the MIMO precoding configuration, to a DMRS port, indicated by the DMRS port configuration, to generate the multi-panel uplink transmission for the first antenna panel; and
   applying a second MIMO precoder, indicated by the MIMO precoding configuration, to the DMRS port to generate the multi-panel uplink transmission for the second antenna panel.

5. The method of claim 1, wherein transmitting the precoded multi-panel uplink transmission comprises transmitting a frequency division multiplexed (FDM) multi-panel uplink transmission.

6. The method of claim 5,
   wherein the precoding information includes a transform precoding configuration that indicates a transform precoder size that is based at least in part on a size of a frequency domain resource allocation (FDRA) associated with the FDM multi-panel uplink transmission.

7. The method of claim 1, wherein receiving the DCI indicating the precoding information comprises receiving an indication that:
   the quantity of layers associated with the multi-panel uplink transmission indicates that the multi-panel uplink transmission is associated with a single layer, and
   the DMRS port configuration indicates a first DMRS port associated with the multi-panel uplink transmission and a second DMRS port associated with the multi-panel uplink transmission.

8. The method of claim 7, wherein the DMRS port configuration indicates that the first DMRS port is associated with the first antenna panel and that the second DMRS port is associated with the second antenna panel.

9. The method of claim 7, wherein the DMRS port configuration indicates a first phase tracking reference signal (PTRS) associated with the first DMRS port and a second PTRS associated with the second DMRS port.

10. The method of claim 7, wherein the DMRS port configuration indicates that the first DMRS port and the second DMRS port are associated with the same DMRS code-division multiplexing (CDM) group or different DMRS CDM groups.

11. The method of claim 1, wherein precoding the multi-panel uplink transmission for transmission via the first antenna panel of the UE and the second antenna panel of the UE comprises:
   applying a first MIMO precoder to a first DMRS port to generate the multi-panel uplink transmission for the first antenna panel; and
   applying a second MIMO precoder to a second DMRS port to generate the multi-panel uplink transmission for the second antenna panel.

12. The method of claim 1, wherein receiving the DCI indicating the precoding information comprises receiving an indication that:
   the quantity of layers associated with the multi-panel uplink transmission indicates a first layer associated with the multi-panel uplink transmission and a second layer associated with the multi-panel uplink transmission, and
   the DMRS port configuration indicates a first DMRS port associated with the first layer and a first DMRS code-division multiplexing (CDM) group and a second DMRS port associated with the second layer and a second DMRS CDM group.

13. The method of claim 1, wherein precoding the multi-panel uplink transmission for transmission via the first antenna panel of the UE and the second antenna panel of the UE comprises:
   mapping the multi-panel uplink transmission to a first layer and a second layer;

applying a first MIMO precoder to a first DMRS port and the first layer to generate the multi-panel uplink transmission for the first antenna panel; and applying a second MIMO precoder to a second DMRS port and the second layer to generate the multi-panel uplink transmission for the second antenna panel.

14. The method of claim 1, wherein precoding the multi-panel uplink transmission for transmission via the first antenna panel of the UE and the second antenna panel of the UE comprises:

applying a first transform precoder to a first layer to generate the multi-panel uplink transmission for the first antenna panel; and applying a second transform precoder to a second layer to generate the multi-panel uplink transmission for the second antenna panel.

15. A user equipment (UE) for wireless communication, comprising:

a processing system that includes one or more processors and one or more memories operatively coupled to the one or more processors, the processing system configured to cause the UE to:

receive downlink control information (DCI) indicating precoding information associated with a multi-panel uplink transmission, the precoding information including at least one of a demodulation reference signal (DMRS) port configuration associated with the multi-panel uplink transmission, a multiple-input multiple-output (MIMO) precoding configuration associated with the multi-panel uplink transmission, or a quantity of layers associated with the multi-panel uplink transmission;

precode the multi-panel uplink transmission for transmission via a first antenna panel of the UE and a second antenna panel of the UE based at least in part on the precoding information; and transmit, using the first antenna panel and the second antenna panel, the precoded multi-panel uplink transmission, wherein the processing system, to transmit the precoded multi-panel uplink transmission, is configured to cause the UE to transmit a single frequency network (SFN) multi-panel uplink transmission.

16. The UE of claim 15, wherein the precoding information includes a transform precoding configuration associated with the multi-panel uplink transmission.

17. The UE of claim 15, wherein the processing system, to receive the DCI indicating the precoding information, is configured to cause the UE to receive an indication that:

the quantity of layers associated with the multi-panel uplink transmission indicates that the multi-panel uplink transmission is associated with a single layer, the DMRS port configuration indicates a DMRS port associated with the multi-panel uplink transmission, and the MIMO precoding configuration indicates a first MIMO precoder associated with the first antenna panel and the DMRS port and a second MIMO precoder associated with the second antenna panel and the DMRS port.

18. The UE of claim 15, wherein the processing system, to cause the UE to precode the multi-panel uplink transmission for transmission via the first antenna panel of the UE and the second antenna panel of the UE, is configured to cause the UE to:

apply a first MIMO precoder, indicated by the MIMO precoding configuration, to a DMRS port, indicated by the DMRS port configuration, to generate the multi-panel uplink transmission for the first antenna panel; and apply a second MIMO precoder, indicated by the MIMO precoding configuration, to the DMRS port to generate the multi-panel uplink transmission for the second antenna panel.

19. The UE of claim 15, wherein the processing system, to cause the UE to transmit the precoded multi-panel uplink transmission, is configured to cause the UE to transmit a frequency division multiplexed (FDM) multi-panel uplink transmission.

20. The UE of claim 19, wherein the precoding information includes a transform precoding configuration that indicates a transform precoder size that is based at least in part on a size of a frequency domain resource allocation (FDRA) associated with the FDM multi-panel uplink transmission.

21. The UE of claim 15, wherein the processing system, to cause the UE to receive the DCI indicating the precoding information, is configured to cause the UE to receive an indication that:

the quantity of layers associated with the multi-panel uplink transmission indicates that the multi-panel uplink transmission is associated with a single layer, and the DMRS port configuration indicates a first DMRS port associated with the multi-panel uplink transmission and a second DMRS port associated with the multi-panel uplink transmission.

22. The UE of claim 21, wherein the DMRS port configuration indicates that the first DMRS port is associated with the first antenna panel and that the second DMRS port is associated with the second antenna panel.

23. The UE of claim 21, wherein the DMRS port configuration indicates a first phase tracking reference signal (PTRS) associated with the first DMRS port and a second PTRS associated with the second DMRS port.

24. The UE of claim 21, wherein the DMRS port configuration indicates that the first DMRS port and the second DMRS port are associated with the same DMRS code-division multiplexing (CDM) group or different DMRS CDM groups.

25. The UE of claim 15, wherein the processing system, to cause the UE to precode the multi-panel uplink transmission for transmission via the first antenna panel of the UE and the second antenna panel of the UE, is configured to cause the UE to:

apply a first MIMO precoder to a first DMRS port to generate the multi-panel uplink transmission for the first antenna panel; and apply a second MIMO precoder to a second DMRS port to generate the multi-panel uplink transmission for the second antenna panel.

26. The UE of claim 15, wherein the processing system, to cause the UE to receive the DCI indicating the precoding information, is configured to cause the UE to receive an indication that:

the quantity of layers associated with the multi-panel uplink transmission indicates a first layer associated with the multi-panel uplink transmission and a second layer associated with the multi-panel uplink transmission, and the DMRS port configuration indicates a first DMRS port associated with the first layer and a first DMRS code-division multiplexing (CDM) group and a second DMRS port associated with the second layer and a second DMRS CDM group.

27. The UE of claim 15, wherein the processing system, to cause the UE to precode the multi-panel uplink transmission for transmission via the first antenna panel of the UE and the second antenna panel of the UE, is configured to cause the UE to:
    map the multi-panel uplink transmission to a first layer and a second layer;
    apply a first MIMO precoder to a first DMRS port and the first layer to generate the multi-panel uplink transmission for the first antenna panel; and
    apply a second MIMO precoder to a second DMRS port and the second layer to generate the multi-panel uplink transmission for the second antenna panel.

28. The UE of claim 15, wherein the processing system, to cause the UE to precode the multi-panel uplink transmission for transmission via the first antenna panel of the UE and the second antenna panel of the UE, is configured to cause the UE to:
    apply a first transform precoder to a first layer to generate the multi-panel uplink transmission for the first antenna panel; and
    apply a second transform precoder to a second layer to generate the multi-panel uplink transmission for the second antenna panel.

29. A non-transitory computer-readable medium storing a set of instructions for wireless communication, the set of instructions comprising:
    one or more instructions that, when executed by one or more processors of a user equipment (UE), cause the UE to:
        receive downlink control information (DCI) indicating precoding information associated with a multi-panel uplink transmission, the precoding information including at least one of a demodulation reference signal (DMRS) port configuration associated with the multi-panel uplink transmission, a multiple-input multiple-output (MIMO) precoding configuration associated with the multi-panel uplink transmission, or a quantity of layers associated with the multi-panel uplink transmission;
        precode the multi-panel uplink transmission for transmission via a first antenna panel of the UE and a second antenna panel of the UE based at least in part on the precoding information; and
        transmit, using the first antenna panel and the second antenna panel, the precoded multi-panel uplink transmission,
            wherein the one or more instructions, to cause the UE to transmit, the precoded multi-panel uplink transmission, are configured to cause the UE to transmit a single frequency network (SFN) multi-panel uplink transmission.

30. An apparatus for wireless communication, comprising:
    means for receiving downlink control information (DCI) indicating precoding information associated with a multi-panel uplink transmission, the precoding information including at least one of a demodulation reference signal (DMRS) port configuration associated with the multi-panel uplink transmission, a multiple-input multiple-output (MIMO) precoding configuration associated with the multi-panel uplink transmission, or a quantity of layers associated with the multi-panel uplink transmission;
    means for precoding the multi-panel uplink transmission for transmission via a first antenna panel of the apparatus and a second antenna panel of the apparatus based at least in part on the precoding information; and
    means for transmitting, using the first antenna panel and the second antenna panel, the precoded multi-panel uplink transmission,
        wherein the means for transmitting the precoded multi-panel uplink transmission comprises means for transmitting a single frequency network (SFN) multi-panel uplink transmission.

* * * * *